United States Patent
Naser et al.

(10) Patent No.: US 12,335,529 B2
(45) Date of Patent: Jun. 17, 2025

(54) METHOD AND DEVICE FOR CONSISTENT INTERACTION OF SIGNALING TOOLS WITH ENCODING TOOLS IN VIDEO DECODING

(71) Applicant: INTERDIGITAL CE PATENT HOLDINGS, SAS, Paris (FR)

(72) Inventors: Karam Naser, Mouazé (FR); Fabrice Le Leannec, Betton (FR); Tangi Poirier, Thorigné-Fouillard (FR); Philippe De Lagrange, Betton (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 17/912,682

(22) PCT Filed: Mar. 15, 2021

(86) PCT No.: PCT/EP2021/056483
§ 371 (c)(1),
(2) Date: Sep. 19, 2022

(87) PCT Pub. No.: WO2021/185733
PCT Pub. Date: Sep. 23, 2021

(65) Prior Publication Data
US 2023/0164360 A1    May 25, 2023

(30) Foreign Application Priority Data
Mar. 20, 2020   (EP) ................................. 20305293
Apr. 17, 2020   (EP) ................................. 20315190

(51) Int. Cl.
*H04N 19/70*   (2014.01)
*H04N 19/132*   (2014.01)
(Continued)

(52) U.S. Cl.
CPC ........... *H04N 19/70* (2014.11); *H04N 19/132* (2014.11); *H04N 19/176* (2014.11); *H04N 19/188* (2014.11); *H04N 19/189* (2014.11)

(58) Field of Classification Search
CPC .... H04N 19/70; H04N 19/132; H04N 19/176; H04N 19/189; H04N 19/44; H04N 19/895
See application file for complete search history.

(56) References Cited

U.S. PATENT DOCUMENTS

2013/0272372 A1*   10/2013   Hannuksela ........... H04N 19/70
                                                      375/240.01
2015/0085938 A1     3/2015   Hendry et al.
(Continued)

FOREIGN PATENT DOCUMENTS

CN   104303503 A   1/2015
CN   108540805 A   9/2018
(Continued)

OTHER PUBLICATIONS

Bross et al., "Versatile Video Coding (Draft 8)", Joint Video Experts Team (JVET) of ITU-T SG 16 WP3 and ISO/IEC JTC 1/SC 29/WG 11, Document: JVET-Q2001-vD, 17th Meeting, Brussels, Belgium, Jan. 7, 2020, 509 pages.
(Continued)

*Primary Examiner* — Richard T Torrente
(74) *Attorney, Agent, or Firm* — Condo Roccia Koptiw LLP

(57) ABSTRACT

A method for video decoding ensuring a consistent interaction of some signaling tools with some encoding tools. The method is particularly advantageous when a container intended to provide parameters required for applying an encoding tool is missing while the encoding tool is activated for a given block. Examples include obtaining a first information indicating if a container of a first type providing at least one coding parameter is absent from the bitstream; checking a value of a first syntax element indicating if a coding tool using said at least one coding parameter is activated for a current block of samples of an image of the video sequence; and, adapting a decoding of the current block in case of absence of the container when the second syntax element indicates an activation of the coding tool.

18 Claims, 5 Drawing Sheets

(51) Int. Cl.
    *H04N 19/169* (2014.01)
    *H04N 19/176* (2014.01)
    *H04N 19/189* (2014.01)

(56) References Cited

U.S. PATENT DOCUMENTS

| | | |
|---|---|---|
| 2015/0092836 A1 | 4/2015 | Kang et al. |
| 2018/0176601 A1 | 6/2018 | Jeong et al. |
| 2019/0068990 A1 | 2/2019 | Kang et al. |
| 2022/0103815 A1* | 3/2022 | Zhang .................. H04N 19/31 |
| 2022/0394304 A1* | 12/2022 | Deng .................. H04N 19/132 |
| 2023/0043717 A1* | 2/2023 | Deng .................. H04N 19/30 |

FOREIGN PATENT DOCUMENTS

| | | |
|---|---|---|
| JP | 2018078633 A | 5/2018 |
| WO | WO 2013109505 A2 | 7/2013 |
| WO | 2014051396 A1 | 4/2014 |

OTHER PUBLICATIONS

Pettersson et al., "AHG17: Signaling absence of NAL unit types in DPS", Joint Video Experts Team (JVET) of ITU-T SG 16 WP 3 and ISO/IEC JTC 1/SC 29/WG 11, Document: JVET-P0366, 16th Meeting, Geneva, Switzerland, Oct. 1, 2019, 4 pages.

\* cited by examiner

METHOD AND DEVICE FOR CONSISTENT INTERACTION OF SIGNALING TOOLS WITH ENCODING TOOLS IN VIDEO DECODING

CROSS REFERENCE TO RELATED APPLICATIONS

This application is a U.S. National Stage Application under 35 U.S.C. 371 of International Patent Application No. PCT/EP2021/056483, filed Mar. 15, 2021, which is incorporated herein by reference in its entirety.

This application claims the benefit of European Patent Application Nos. 20305293.1, filed Mar. 20, 2020; and 20315190.7, filed Apr. 17, 2020.

1. TECHNICAL FIELD

At least one of the present embodiments generally relates to a method and a device for image encoding and decoding, and more particularly, to a method and a device for ensuring a consistent interaction of some signaling tools with some encoding tools.

2. BACKGROUND ART

To achieve high compression efficiency, video coding schemes usually employ predictions and transforms to leverage spatial and temporal redundancies in a video content. During an encoding, images of the video content are divided into blocks of samples (i.e. Pixels), these blocks being then partitioned into one or more sub-blocks, called original sub-blocks in the following. An intra or inter prediction is then applied to each sub-block to exploit intra or inter image correlations. Whatever the prediction method used (intra or inter), a predictor sub-block is determined for each original sub-block. Then, a sub-block representing a difference between the original sub-block and the predictor sub-block, often denoted as a prediction error sub-block, a prediction residual sub-block or simply a residual block, is transformed, quantized and entropy coded to generate an encoded video stream. To reconstruct the video, the compressed data is decoded by inverse processes corresponding to the transform, quantization and entropic coding.

The complexity of the video compression methods has strongly increased comparing to the first video compression methods such as MPEG-1 (ISO/CEI-11172), MPEG-2 (ISO/CEI 13818-2) or MPEG-4/AVC (ISO/CEI 14496-10). Indeed, many new coding tools appeared, or existing coding tools were refined in the last generations of video compression standards (for example in the international standard entitled Versatile Video Coding (VVC) under development by a joint collaborative team of ITU-T and ISO/IEC experts known as the Joint Video Experts Team (JVET) or in the standard HEVC (ISO/IEC 23008-2—MPEG-H Part 2, High Efficiency Video Coding/ITU-T H.265)). In Parallel, some signaling tools were proposed allowing for example signaling parameters of some coding tools that are shared by many sub-blocks all along a video sequence. One of these signaling tool is the adaptation parameter set (APS). An APS is a particular data container (called NAL (Network Abstraction Layer) unit) providing parameters for the Adaptive Loop Filter (ALF) coding tool, the Luma Mapping with Chroma Scaling (LMCS) coding tool and for scaling matrices used for quantization.

In some cases, an APS could be absent from a bitstream while the coding tools using the parameters signaled the APS are activated.

It is desirable to propose solutions allowing a consistent behavior of an encoder or a decoder when a signaling container is absent from a bitstream while coding tools referring to the parameters provided by this signaling container are activated.

BRIEF SUMMARY

In a first aspect, one or more of the present embodiments provide a method for decoding, the method comprising: obtaining a bitstream representative of an encoded video sequence; obtaining a first information indicating if a container of a first type providing at least one coding parameter is absent from the bitstream; checking a value of a first syntax element indicating if a coding tool using said at least one coding parameter is activated for a current block of samples of an image of the video sequence; and, adapting a decoding of the current block in case of absence of the container when the second syntax element indicates an activation of the coding tool.

In an embodiment, the first information is obtained from a second syntax element obtained from the bitstream.

In an embodiment, the container of the first type is an adaptation parameter set and the second syntax element indicates if a presence of at least one adaptation parameter set in the bitstream is authorized.

In an embodiment, the adapting of the decoding of the current block comprises outputting a second information representative of a nonconformance of the bitstream.

In an embodiment, the adapting of the decoding of the current block comprises deactivating the coding tool for decoding the current block.

In an embodiment, the adapting of the decoding comprises obtaining the at least one parameter from at least one container of at least one second type and decoding the current block applying the coding tool with the obtained parameter.

In an embodiment, the at least one container of the at least one second type is a sequence parameter set and/or a picture parameter set and/or a picture header and/or a sequence header.

In a second aspect, one or more of the present embodiments provide a method for encoding, the method comprising: obtaining a video sequence to encode in a bitstream; adapting an encoding of a block of samples of an image of the video sequence in function of a first information indicating if a presence in the bitstream of a container of a first type providing at least one coding parameter for a coding tool is authorized.

In an embodiment, the first information is encoded in the bitstream.

In an embodiment, the container of the first type is an adaptation parameter set and the second syntax element indicates if a presence of at least one adaptation parameter set in the bitstream is authorized.

In an embodiment, the adapting of the encoding comprises removing the coding tool from a list of coding tools considered for encoding the current block if the presence of the container is not authorized.

In an embodiment, the adapting of the encoding comprises encoding the at least one coding parameter in at least one container of at least one second type if a use of the coding tool is authorized for encoding the current block.

In an embodiment, the at least one container of the at least one second type is a sequence parameter set and/or a picture parameter set and/or a picture header and/or a sequence header.

In a third aspect, one or more of the present embodiments provide a device for decoding, the device comprising electronic circuitry adapted for: obtaining a bitstream representative of an encoded video sequence; obtaining a first information indicating if a container of a first type providing at least one coding parameter is absent from the bitstream; checking a value of a first syntax element indicating if a coding tool using said at least one coding parameter is activated for a current block of samples of an image of the video sequence; and, adapting a decoding of the current block in case of absence of the container when the second syntax element indicates an activation of the coding tool.

In an embodiment, the first information is obtained from a second syntax element obtained from the bitstream.

In an embodiment, the container of the first type is an adaptation parameter set and the second syntax element indicates if a presence of at least one adaptation parameter set in the bitstream is authorized.

In an embodiment, the adapting of the decoding of the current block comprises outputting a second information representative of a nonconformance of the bitstream.

In an embodiment, the adapting of the decoding of the current block comprises deactivating the coding tool for decoding the current block.

In an embodiment, the adapting of the decoding comprises obtaining the at least one parameter from at least one container of at least one second type and decoding the current block applying the coding tool with the obtained parameter.

In an embodiment, the at least one container of the at least one second type is a sequence parameter set and/or a picture parameter set and/or a picture header and/or a sequence header.

In a fourth aspect, one or more of the present embodiments provide a device for encoding, the device comprising electronic circuitry adapted for: obtaining a video sequence to encode in a bitstream; adapting an encoding of a block of samples of an image of the video sequence in function of a first information indicating if a presence in the bitstream of a container of a first type providing at least one coding parameter for a coding tool is authorized.

In an embodiment, the first information is encoded in the bitstream.

In an embodiment, the container of the first type is an adaptation parameter set and the second syntax element indicates if a presence of at least one adaptation parameter set in the bitstream is authorized.

In an embodiment, the adapting of the encoding comprises removing the coding tool from a list of coding tools considered for encoding the current block if the presence of the container is not authorized.

In an embodiment, the adapting of the encoding comprises encoding the at least one coding parameter in at least one container of at least one second type if a use of the coding tool is authorized for encoding the current block.

In an embodiment, the at least one container of the at least one second type is a sequence parameter set and/or a picture parameter set and/or a picture header and/or a sequence header.

In a fifth aspect, one or more of the present embodiments provide a signal comprising data generated according to the method for encoding according to the second aspect, or by the device for encoding according to fourth aspect.

In a sixth aspect, one or more of the present embodiments provide a computer program comprising program code instructions for implementing the method according to the first or the second aspect.

In a seventh aspect, one or more of the present embodiments provide information storage means storing program code instructions for implementing the method according to the first or the second aspect.

DETAILED DESCRIPTION

In the following description, some embodiments use tools developed in the context of VVC or in the context of HEVC. However, these embodiments are not limited to the video coding/decoding method corresponding to VVC or HEVC and applies to other video coding/decoding methods but also to any method in which an image is predicted from another image.

Figure 1:
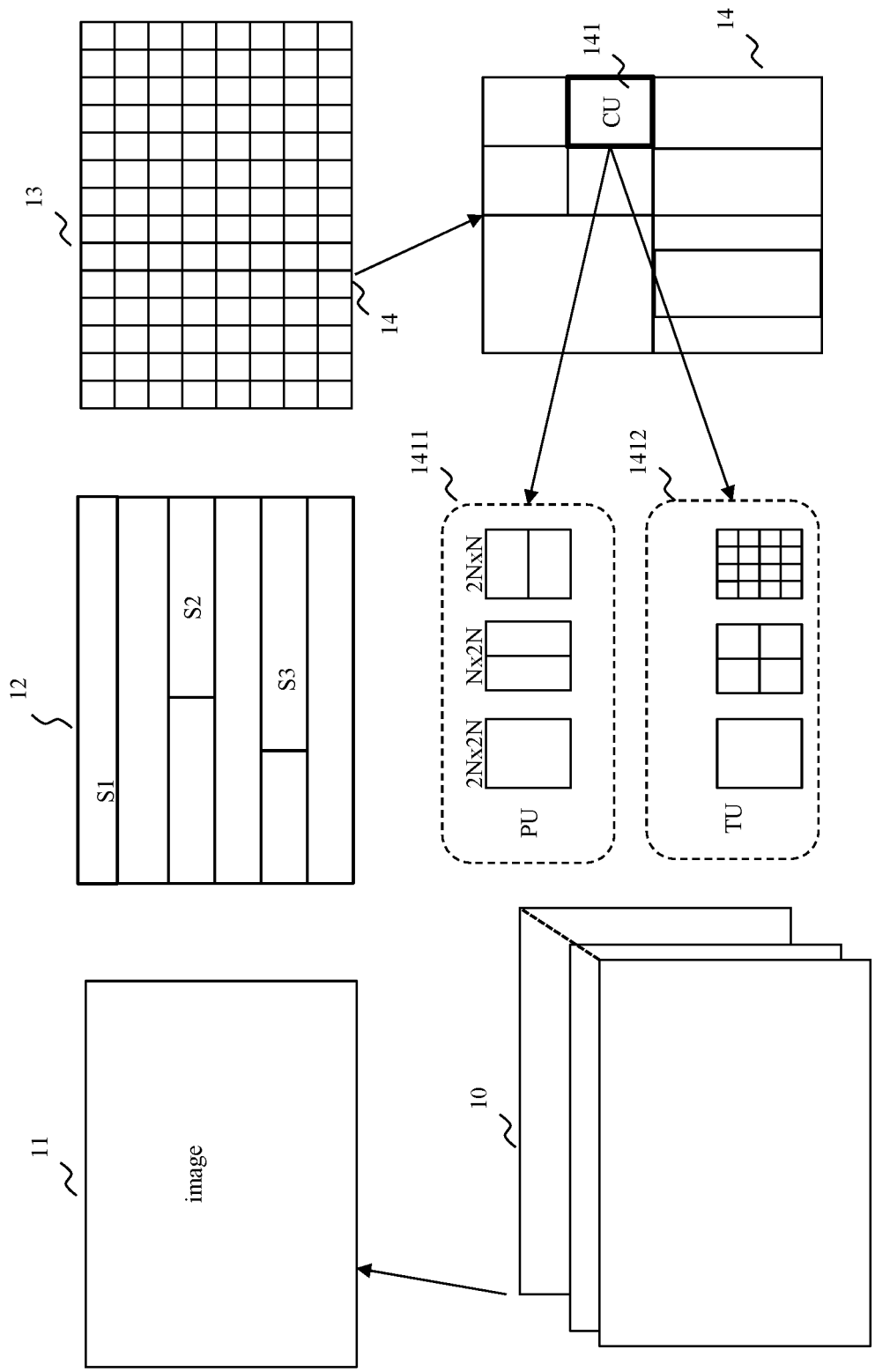
FIG. 1 illustrates an example of partitioning undergone by an image of pixels of an original video.

FIG. 1 illustrates an example of partitioning undergone by an image of samples 11 of an original video 10. It is considered here that a sample is composed of three components: a luminance component and two chrominance components. In that case, a sample corresponds to a pixel. However, the following embodiments are adapted to images constituted of samples comprising another number of components, for instance grey level samples wherein samples comprise one component, or images constituted of samples comprising three color components and a transparency component and/or a depth component. The following embodiments are adapted to one component of a image. In that case a sample correspond to a value of one component.

An image is divided in a plurality of coding entities. First, as represented by reference 13 in FIG. 1, an image is divided in a grid of blocks called coding tree units (CTU). A CTU consists of an N×N block of luminance samples together with two corresponding blocks of chrominance samples. N is in general a power of two having, for example, a maximum value of "128". Second, an image is divided into one or more groups of CTU. For example, it can be divided into one or more tile rows and tile columns, a tile being a sequence of CTU covering a rectangular region of an image. In some cases, a tile could be divided into one or more bricks, each of which consisting of at least one row of CTU within the tile. Above the concept of tiles and bricks, another encoding entity, called slice, exists, that can contain at least one tile of an image or at least one brick of a tile.

In the example in FIG. 1, as represented by reference 12, the image 11 is divided into three slices S1, S2 and S3, each comprising a plurality of tiles (not represented).

As represented by reference 14 in FIG. 1, a CTU may be partitioned in the form of a hierarchical tree of one or more sub-blocks called coding units (CU). The CTU is the root (i.e. the parent node) of the hierarchical tree and can be partitioned in a plurality of CU (i.e. child nodes). Each CU becomes a leaf of the hierarchical tree if it is not further partitioned in smaller CU or becomes a parent node of smaller CU (i.e. child nodes) if it is further partitioned. Several types of hierarchical trees can be applied comprising for example a quadtree, a binary tree and a ternary tree. In a quadtree, a CTU (respectively a CU) can be partitioned in (i.e. can be the parent node of) "4" square CU of equal sizes. In a binary tree, a CTU (respectively a CU) can be partitioned horizontally or vertically in "2" rectangular CU of equal sizes. In a ternary tree, a CTU (respectively a CU) can be partitioned horizontally or vertically in "3" rectangular CU. For example a CU of height N and width M is vertically (respectively horizontally) partitioned in a first CU of height N (resp. N/4) and width M/4 (resp. M), a second CU of height N (resp. N/2) and width M/2 (resp. M), and a third CU of height N (resp. N/4) and width M/4 (resp. M).

In the example of FIG. 1, the CTU 14 is first partitioned in "4" square CU using a quadtree type partitioning. The upper left CU is a leaf of the hierarchical tree since it is not further partitioned, i.e. it is not a parent node of any other CU. The upper right CU is further partitioned in "4" smaller square CU using again a quadtree type partitioning. The bottom right CU is vertically partitioned in "2" rectangular CU using a binary tree type partitioning. The bottom left CU is vertically partitioned in "3" rectangular CU using a ternary tree type partitioning.

During the coding of an image, the partitioning is adaptive, each CTU being partitioned in order to optimize a compression efficiency of the CTU criterion.

In some compression method appeared concepts of prediction unit (PU) and transform unit (TU). In that case, the coding entity that is used for prediction (i.e. a PU) and transform (i.e. a TU) can be a subdivision of a CU. For example, as represented in FIG. 1, a CU of size 2N×2N, can be divided in PU 1411 of size N×2N or of size 2N×N. In addition, said CU can be divided in "4" TU 1412 of size N×N or in "16" TU of size (N/2)×(N/2).

In the present application, the term "block" or "image block" or "sub-block" can be used to refer to any one of a CTU, a CU, a PU and a TU. In addition, the term "block" or "image block" can be used to refer to a macroblock, a partition and a sub-block as specified in MPEG-4/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture", "sub-picture", "slice" and "frame" may be used interchangeably.

Figure 2:
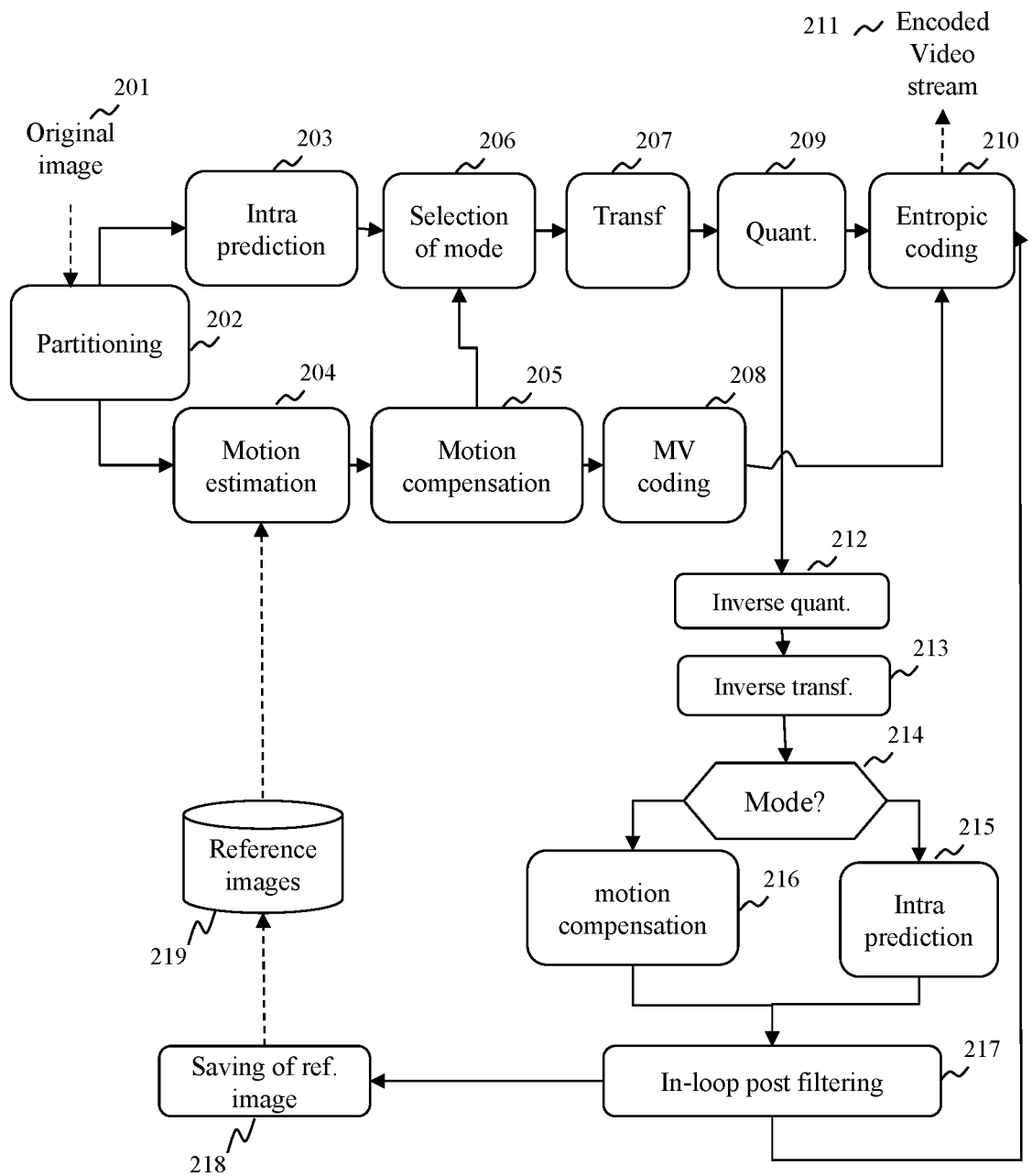
FIG. 2 depicts schematically a method for encoding a video stream executed by an encoding module.

FIG. 2 depicts schematically a method for encoding a video stream executed by an encoding module. Variations of this method for encoding are contemplated, but the method for encoding of FIG. 2 is described below for purposes of clarity without describing all expected variations.

The encoding of a current original image 201 begins with a partitioning of the current original image 201 during a step 202, as described in relation to FIG. 1. The current image 201 is thus partitioned into CTU, CU, PU, TU, etc. For each block, the encoding module determines a coding mode between an intra prediction and an inter prediction.

The intra prediction, represented by step 203, consists of predicting, in accordance with an intra prediction method, the samples of a current block from a prediction block derived from samples of reconstructed blocks situated in a causal vicinity of the current block to be coded. The result of the intra prediction is a prediction direction indicating which samples of the blocks in the vicinity to use, and a residual block resulting from a calculation of a difference between the current block and the prediction block.

The inter prediction consists of predicting the samples of a current block from a block of samples, referred to as the reference block, of an image preceding or following the current image, this image being referred to as the reference image. During the coding of a current block in accordance with the inter prediction method, a block of the reference image closest, in accordance with a similarity criterion, to the current block is determined by a motion estimation step 204. During step 204, a motion vector indicating the position of the reference block in the reference image is determined. Said motion vector is used during a motion compensation step 205 during which a residual block is calculated in the form of a difference between the current block and the reference block.

In the first video compression standards, the mono-directional inter prediction mode described above was the only inter mode available. As video compression standards evolved, the family of inter modes has grown significantly and comprises now many different inter modes.

During a selection step 206, the prediction mode optimizing the compression performances, in accordance with a rate/distortion criterion (i.e. RDO criterion), among the prediction modes tested (Intra prediction modes, Inter prediction modes) is selected by the encoding module.

When the prediction mode is selected, the residual block is transformed during a step 207 and quantized during a step 209. During the quantization, in transformed domain, the transformed coefficients are weighted by a scaling matrix in addition to the quantization parameter. The scaling matrix is a coding tool allowing favoring some frequencies at the expense of other frequencies. In general, low frequencies are favored. Some video compression methods allow applying a user-defined scaling matrix instead of a default scaling matrix. In that case, parameters of the scaling matrix need to be transmitted to the decoder. In some implementation, the parameters of the non-default scaling matrix are specified using signaling tool such as a signalization container (i.e. a NAL (Network Abstraction layer) unit). In some implementations, the NAL unit used to signal the scaling matrix parameters is called Adaptation Parameter Set (APS).

Note that the encoding module can skip the transform and apply quantization directly to the non-transformed residual signal.

When the current block is coded according to an intra prediction mode, a prediction direction and the transformed and quantized residual block are encoded by an entropic encoder during a step 210.

When the current block is encoded according to an inter prediction mode, the motion data associated with this inter prediction mode are coded in a step 208.

In general, two modes can be used to encode the motion data, respectively called AMVP (Adaptive Motion Vector Prediction) and Merge.

AMVP basically consists in signaling a reference image(s) used to predict a current block, a motion vector predictor index and a motion vector difference (also called motion vector residual).

The merge mode consists in signaling an index of some motion data collected in a list of motion data predictors. The list is made of "5" or "7" candidates and is constructed the same way on the decoder and encoder sides. Therefore, the merge mode aims at deriving some motion data taken from the merge list. The merge list typically contains motion data associated to some spatially and temporally neighboring blocks, available in their reconstructed state when the current block is being processed.

Once predicted, the motion information is next encoded by the entropic encoder during step 210, along with transformed and quantized residual block. Note that the encoding module can bypass both transform and quantization, i.e., the entropic encoding is applied on the residual without the application of the transform or quantization processes. The result of the entropic encoding is inserted in an encoded video stream (i.e. a bitstream) 211.

Note that the entropic encoder can be implemented in a form of a context adaptive binary arithmetic coder (CABAC). CABAC encodes binary symbols, which keeps the complexity low and allows probability modelling for more frequently used bits of any symbol.

After the quantization step 209, the current block is reconstructed so that the pixels corresponding to that block can be used for future predictions. This reconstruction phase is also referred to as a prediction loop. An inverse quantization is therefore applied to the transformed and quantized residual block during a step 212 and an inverse transformation is applied during a step 213. According to the prediction mode used for the current block obtained during a step 214, the prediction block of the current block is reconstructed. If the current block is encoded according to an inter prediction mode, the encoding module applies, when appropriate, during a step 216, a motion compensation to a reference block using the motion information of the current block. If the current block is encoded according to an intra prediction mode, during a step 215, the prediction direction corresponding to the current block is used for reconstructing the reference block of the current block. The reference block and the reconstructed residual block are added in order to obtain the reconstructed current block.

Following the reconstruction, an in-loop post-filtering intended to reduce the encoding artefacts is applied, during a step 217, to the reconstructed block. This post-filtering is called in-loop post-filtering since this post-filtering occurs in the prediction loop to obtain at the encoder the same reference images as the decoder and thus avoid a drift between the encoding and the decoding processes. For instance, the in-loop post-filtering comprises a deblocking filtering, a SAO (sample adaptive offset) filtering and an Adaptive Loop Filtering (ALF) with block-based filter adaption.

In ALF, for the luma component, one among a plurality of filters is selected for each 4×4 block of an image, based on a direction and an activity of local gradients. The filter selection is based on a classification of 4×4 blocks. ALF filter parameters need to be transmitted to the decoder. In some implementation, the ALF filter parameters are signaled in an Adaptation Parameter Set (APS).

Parameters representative of the activation or the deactivation of the in-loop deblocking filter and when activated, of characteristics of said in-loop deblocking filter are introduced in the encoded video stream 211 during the entropic coding step 210.

A new coding tool, appeared in the last generation video compression method, has added a new processing block before the in-loop post filtering. This coding tool called Luma Mapping with Chroma Scaling (LMCS) has two main components: an in-loop mapping of the luma component based on adaptive piecewise linear models; for the chroma components, luma-dependent chroma residual scaling is applied. The in-loop mapping of the luma component adjusts the dynamic range of the input signal by redistributing the codewords across the dynamic range to improve compression efficiency. Chroma residual scaling is designed to compensate for the interaction between the luma signal and its corresponding chroma signals. Parameters of LMCS need to be transmitted to the decoder. In some implementation, the parameters of LMCS are signaled in an Adaptation Parameter Set (APS).

Another new coding tool appeared in the last generation video compression method is called Gradual Decoding Refresh (GDR). GDR provides virtual boundaries of reconstructed images where one part is not available as a prediction reference. When GDR is activated for an image, its NAL unit type is signaled as GDR_NUT.

When a block is reconstructed, it is inserted during a step 218 into a reconstructed image stored in the decoded picture buffer (DPB) 219. The reconstructed images thus stored can then serve as reference images for other images to be coded.

Figure 3:
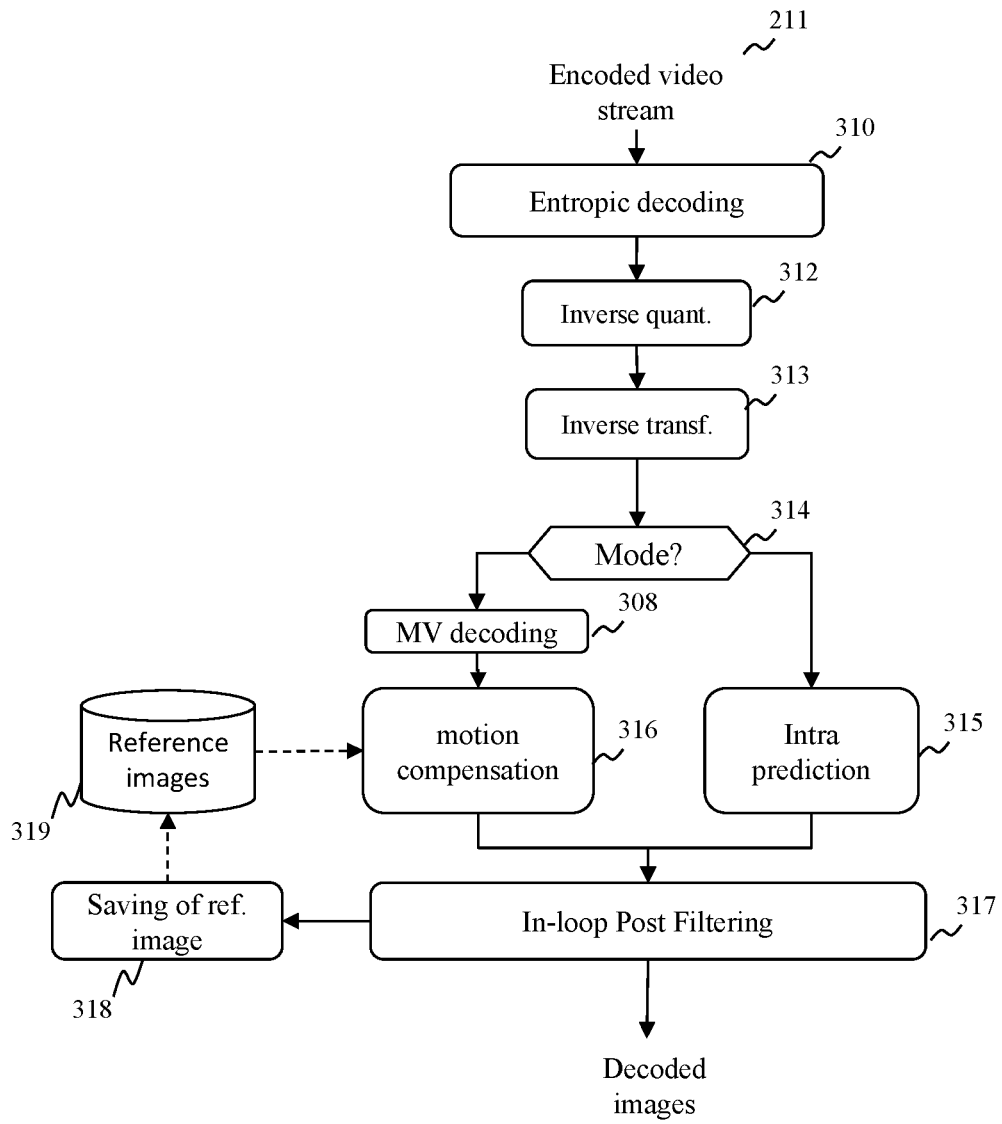
FIG. 3 depicts schematically a method for decoding the encoded video stream (i.e. the bitstream)

FIG. 3 depicts schematically a method for decoding the encoded video stream (i.e. the bitstream) 211 encoded according to method described in relation to FIG. 2. Said method for decoding is executed by a decoding module. Variations of this method for decoding are contemplated, but the method for decoding of FIG. 3 is described below for purposes of clarity without describing all expected variations.

The decoding is done block by block. For a current block, it starts with an entropic decoding of the current block during a step 310. Entropic decoding allows to obtain the prediction mode of the current block.

If the current block has been encoded according to an intra prediction mode, the entropic decoding allows to obtain, information representative of an intra prediction direction and a residual block.

If the current block has been encoded according to an inter prediction mode, the entropic decoding allows to obtain, information representative of motion data and a residual block. When appropriate, during a step 308, the motion data are reconstructed for the current block according to the AMVP or the merge mode. In the merge mode, the motion data obtained by the entropic decoding comprise an index in a list of motion vector predictor candidates. The decoding module applies the same process than the encoding module to construct the list of candidates for the regular merge mode and a sub-block merge mode. With the reconstructed list and the index, the decoding module is able to retrieve a motion vector used to predict the motion vector of a block.

The method for decoding comprises steps 312, 313, 315, 316 and 317 in all respects identical respectively to steps 212, 213, 215, 216 and 217 of the method for encoding. Whereas at the encoding module level, the step 214 comprises a mode selection process evaluating each mode according to a rate distortion criterion and selecting the best mode, step 314 just consists in reading an information representative of a selected mode in the bitstream 211. Decoded blocks are saved in decoded images and the decoded images are stored in a DPB 319 in a step 318. When the decoding module decodes a given image, the images stored in the DPB 319 are identical to the images stored in the DPB 219 by the encoding module during the encoding of said given image. The decoded image can also be outputted by the decoding module for instance to be displayed.

In the particular case of a current block encoded using ALF, LMCS or using a non-default scaling matrix, the decoder needs to obtain the ALF, LMCS and non-default scaling matrix parameters. As mentioned above, ALF, LMCS and non-default scaling matrix parameters are provided by an APS. However, in some situations, a bitstream received by a decoder may not comprise an APS while ALF and/or LMCS and/or the use of a non-default scaling matrix is/are activated for the current block. Such situations may occur when the APS has been lost during a transmission. Such situations may also occur when a bitstream was natively encoded without APS. In particular, some video compression methods allow specifying that an encoded video stream doesn't comprise any APS. In some case, this feature is specified in the encoded video stream for example at a sequence header level by a flag called no_aps_constraint_flag. If the flag no_aps_constraint_flag equals one, a presence of an APS in the encoded video stream in not authorized. Otherwise, if the flag no_aps_constraint_flag equals zero, there is no constraint on the presence of APS in the encoded video stream. The flag no_aps_constraint_flag is for example encoded in a syntax element called general_constraint_info( ), the syntax element general constraint info( ) being encoded in a syntax element profile_tier_level ( ), the syntax element profile_tier_level( ) being embedded in a signal container DPS (decoding Parameter Set), VPS (Video Parameter Set), or SPS (Sequence Parameter Set). Embodiments described below propose solutions allowing a consistent behavior of an encoder or a decoder when an APS is absent from a bitstream while coding tools referring to the parameters provided by the APS are activated.

Similarly to the flag no_aps_constraint_flag, there exist another constraint flag to disallow a use of NAL unit of type GDR_NUT. This flag is named no_gdr_constraint_flag. Instead of deactivating GDR itself, it disallows a use of GDR NAL units.

Figure 4A:
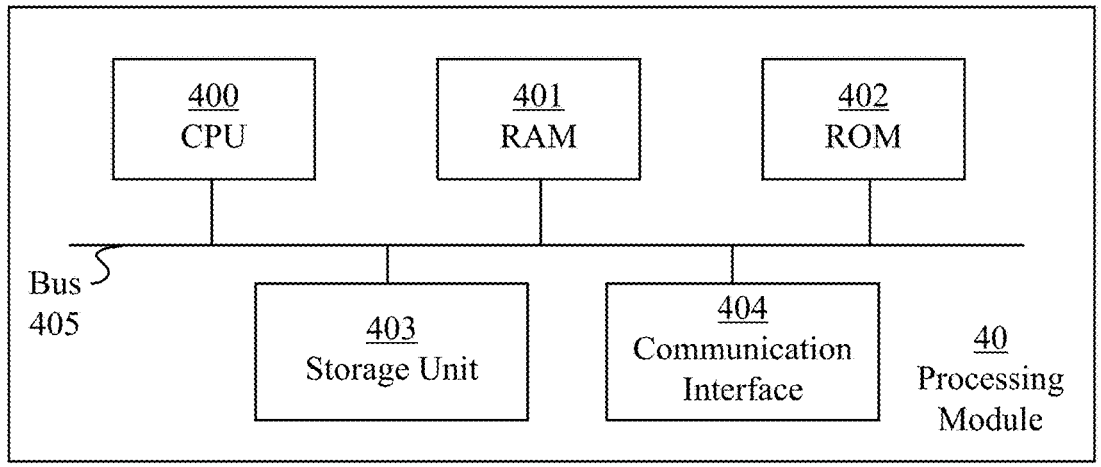
FIG. 4A illustrates schematically an example of hardware architecture of a processing module able to implement an encoding module or a decoding module in which various aspects and embodiments are implemented.

FIG. 4A illustrates schematically an example of hardware architecture of a processing module 40 able to implement an encoding module or a decoding module capable of implementing respectively a method for encoding of FIG. 2 and a method for decoding of FIG. 3 modified according to different aspects and embodiments. The processing module 40 comprises, connected by a communication bus 405: a processor or CPU (central processing unit) 400 encompassing one or more microprocessors, general purpose computers, special purpose computers, and processors based on a multi-core architecture, as non-limiting examples; a random access memory (RAM) 401; a read only memory (ROM) 402; a storage unit 403, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 404 for exchanging data with other modules, devices or equipment. The communication interface 404 can include, but is not limited to, a transceiver configured to transmit and to receive data over communication channel. The communication interface 404 can include, but is not limited to, a modem or network card.

If the processing module 40 implements a decoding module, the communication interface 404 enables for instance the processing module 40 to receive encoded video streams and to provide a decoded video stream. If the processing module 40 implements an encoding module, the communication interface 404 enables for instance the processing module 40 to receive original image data to encode and to provide an encoded video stream.

The processor 400 is capable of executing instructions loaded into the RAM 401 from the ROM 402, from an external memory (not shown), from a storage medium, or from a communication network. When the processing module 40 is powered up, the processor 400 is capable of reading instructions from the RAM 401 and executing them. These instructions form a computer program causing, for example, the implementation by the processor 400 of a decoding method as described in relation with FIG. 3 or an encoding method described in relation to FIG. 2, the decoding and encoding methods comprising various aspects and embodiments described below in this document.

All or some of the algorithms and steps of said encoding or decoding methods may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 4B:
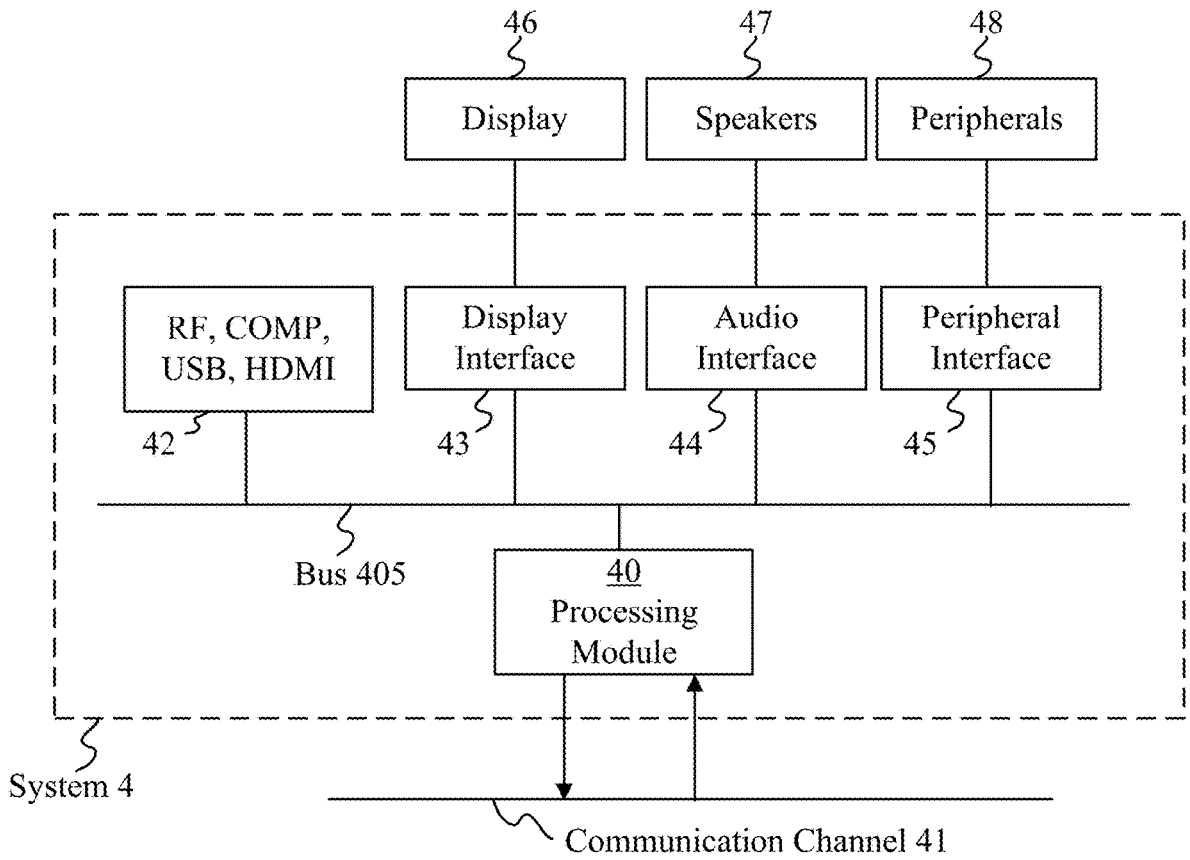
FIG. 4B illustrates a block diagram of an example of a system in which various aspects and embodiments are implemented.

FIG. 4B illustrates a block diagram of an example of a system 4 in which various aspects and embodiments are implemented. System 4 can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 4, singly or in combination, can be embodied in a single integrated circuit (IC), multiple ICs, and/or discrete components. For example, in at least one embodiment, the system 4 comprises one processing module 40 that implement a decoding module or an encoding module. But, in another embodiment, the system 4 can comprise a first processing module 40 implementing a decoding module and a second processing module 40 implementing an encoding module or one processing module 40 implementing a decoding module and an encoding module. In various embodiments, the system 40 is communicatively coupled to one or more other systems, or other electronic devices, via, for example, a communications bus or through dedicated input and/or output ports. In various embodiments, the system 4 is configured to implement one or more of the aspects described in this document.

The system 4 comprises at least one processing module 40 capable of implementing one of an encoding module or a decoding module or both.

The input to the processing module 40 can be provided through various input modules as indicated in block 42. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 4B, include composite video.

In various embodiments, the input modules of block 42 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 4 to other electronic devices across USB and/or HDMI connections. It is to be understood that various aspects of input processing, for example, Reed-Solomon error correction, can be implemented, for example, within a separate input processing IC or within the processing module 40 as necessary. Similarly, aspects of USB or HDMI interface processing can be implemented within separate interface ICs or within the processing module 40 as necessary. The demodulated, error corrected, and demultiplexed stream is provided to the processing module 40.

Various elements of system 4 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 4, the processing module 40 is interconnected to other elements of said system 4 by the bus 405.

The communication interface 404 of the processing module 40 allows the system 4 to communicate on a communication channel 41. The communication channel 41 can be implemented, for example, within a wired and/or a wireless medium.

Data is streamed, or otherwise provided, to the system 4, in various embodiments, using a wireless network such as a Wi-Fi network, for example IEEE 802.11 (IEEE refers to the Institute of Electrical and Electronics Engineers). The Wi-Fi signal of these embodiments is received over the communications channel 41 and the communications interface 404 which are adapted for Wi-Fi communications. The communications channel 41 of these embodiments is typically connected to an access point or router that provides access to external networks including the Internet for allowing streaming applications and other over-the-top communications. Other embodiments provide streamed data to the system 4 using a set-top box that delivers the data over the HDMI connection of the input block 42. Still other embodiments provide streamed data to the system 4 using the RF connection of the input block 42. As indicated above, various embodiments provide data in a non-streaming manner. Additionally, various embodiments use wireless networks other than Wi-Fi, for example a cellular network or a Bluetooth network.

The system 4 can provide an output signal to various output devices, including a display 46, speakers 47, and other peripheral devices 48. The display 46 of various embodiments includes one or more of, for example, a touchscreen display, an organic light-emitting diode (OLED) display, a curved display, and/or a foldable display. The display 46 can be for a television, a tablet, a laptop, a cell phone (mobile phone), or other devices. The display 46 can also be integrated with other components (for example, as in a smart phone), or separate (for example, an external monitor for a laptop). The other peripheral devices 46 include, in various examples of embodiments, one or more of a stand-alone digital video disc (or digital versatile disc) (DVR, for both terms), a disk player, a stereo system, and/or a lighting system. Various embodiments use one or more peripheral devices 48 that provide a function based on the output of the system 4. For example, a disk player performs the function of playing the output of the system 4.

In various embodiments, control signals are communicated between the system 4 and the display 46, speakers 47, or other peripheral devices 48 using signaling such as AV.Link, Consumer Electronics Control (CEC), or other communications protocols that enable device-to-device control with or without user intervention. The output devices can be communicatively coupled to system 4 via dedicated connections through respective interfaces 43, 44, and 45. Alternatively, the output devices can be connected to system 4 using the communications channel 41 via the communications interface 404. The display 46 and speakers 47 can be integrated in a single unit with the other components of system 4 in an electronic device such as, for example, a television. In various embodiments, the display interface 43 includes a display driver, such as, for example, a timing controller (T Con) chip.

The display 46 and speaker 47 can alternatively be separate from one or more of the other components, for example, if the RF module of input 42 is part of a separate set-top box. In various embodiments in which the display 46 and speakers 47 are external components, the output signal can be provided via dedicated output connections, including, for example, HDMI ports, USB ports, or COMP outputs.

Various implementations involve decoding. "Decoding", as used in this application, can encompass all or part of the processes performed, for example, on a received encoded video stream in order to produce a final output suitable for display. In various embodiments, such processes include one or more of the processes typically performed by a decoder, for example, entropy decoding, inverse quantization, inverse transformation, and prediction. In various embodiments, such processes also, or alternatively, include processes performed by a decoder of various implementations or embodiments described in this application, for example, for determining if an APS is present in the bitstream or for adapting a decoding of a current block when ALF and/or LMCS and/or a use of a non-default scaling matrix is activated for the current block while no APS is available for the decoder.

As further examples, in one embodiment "decoding" refers only to in-loop post-filtering (step 317 in FIG. 3), or inverse quantization (step 312 in FIG. 3). Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded video stream. In various embodiments, such processes include one or more of the processes typically performed by an encoder, for example, partitioning, prediction, transformation, quantization, in-loop post-filtering and entropy encoding. In various embodiments, such processes also, or alternatively, include processes performed by an encoder of various implementations or embodiments described in this application, for example, for adapting an encoding of a block in function of a presence or absence of an APS in the bitstream.

As further examples, in one embodiment "encoding" refers to the quantization and inverse quantization (steps 209 and 212 in FIG. 2) and in-loop post-filtering (step 217 in FIG. 2). Whether the phrase "encoding process" is intended to refer specifically to a subset of operations or generally to the broader encoding process will be clear based on the context of the specific descriptions and is believed to be well understood by those skilled in the art.

Note that the syntax elements names, flags names, containers names, coding tools names as used herein, are descriptive terms. As such, they do not preclude the use of other syntax element, flags, containers, or coding tools names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between a rate and a distortion is usually considered. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of a reconstructed signal after coding and decoding. Faster approaches may also be used, to save encoding complexity, in particular with computation of an approximated distortion based on a prediction or a prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, inferring the information from other information(s), retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, inferring the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, inferring the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals syntax elements or parameters related to ALF, LMCS and scaling matrices. In this way, in an embodiment the same parameters are used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded video stream of a described embodiment. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

Figure 5:
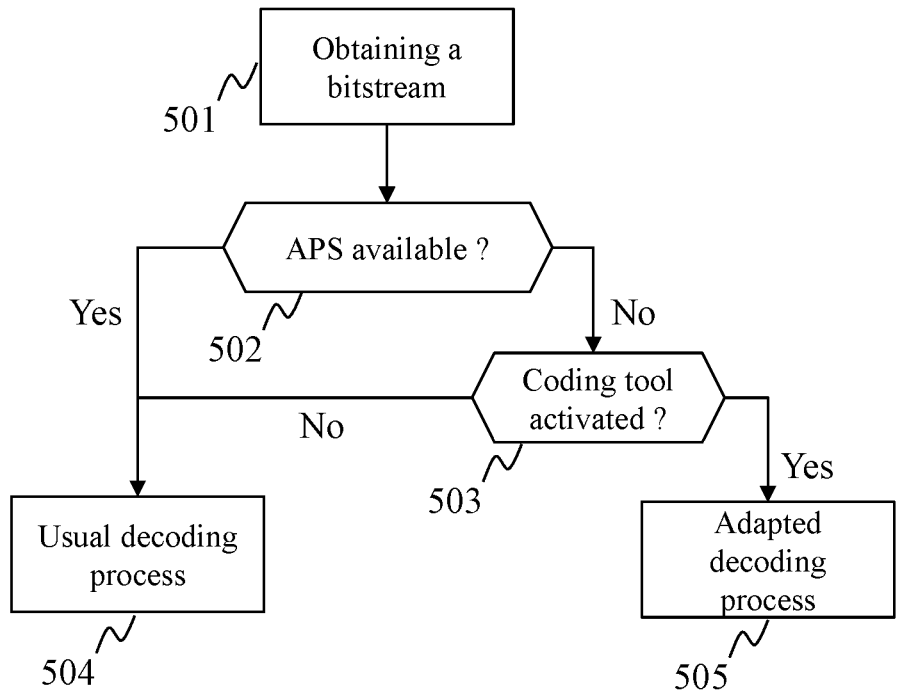
FIG. 5 depicts schematically a solution for adapting a decoding process when an APS is not available at the decoder side; and, FIG. 6 depicts schematically a solution for adapting an encoding process when no APS can be used.

FIG. 5 depicts schematically a solution for adapting a decoding process when an APS is not available at the decoder side.

The process of FIG. 5 is executed by the processing module 40 when the processing module 40 implements a decoding module.

In a step 501, the processing module 40 obtains an encoded video stream 211. During steps 501, the processing module 40 starts the decoding process by applying the decoding method represented by FIG. 3 to the encoded video stream 211. At the end of step 501, the processing module is ready to decode a current block.

In a step 502, the processing module 40 obtains an information indicating if an APS is absent from the encoded video stream. In a first embodiment of step 502, the processing module 40 determines if a presence of an APS in the encoded video stream 211 is authorized from a flag no_aps_s_constraint_flag obtained from the encoded video stream 211. If the presence of an APS in the encoded video stream is authorized, the processing module 40 executes a usual decoding process on the current block.

If no APS is available in the encoded video stream 211, step 502 is followed by a step 503. In the first embodiment of step 502, no APS is available in the encoded video stream 211 when the presence of an APS in the encoded video stream 211 is not authorized, according to the flag no_aps_constraint_flag (no_aps_constraint_flag=1).

In the step 503, the processing module 40 checks a value of a syntax element indicating if a coding tool using at least one coding parameter provided by an APS is activated for the current block. In a first embodiment of step 503, the syntax element indicating if a coding tool using at least one coding parameter provided by an APS is activated for the current block is one of a flag sps_alf_enabled_flag, a flag sps_lmcs_enabled_flag and the flag sps_scaling_list_enabled_flag. The flag sps_alf_enabled_flag specifies at the sequence level (sequence Parameter Set (SPS)) that the adaptive loop filter is disabled when equal to zero. sps_alf_enabled_flag equal to one specifies that the adaptive loop filter is enabled. The flag sps_lmcs_enabled_flag specifies at the SPS level, when equal to one that LMCS is used in the encoded video stream. sps_lmcs_enabled_flag equal to zero specifies that LMCS is not used in the encoded video stream. The flag sps_scaling_list_enabled_flag specifies at the SPS level, when equal to one, that a non-default scaling matrix is used for the scaling process for transform coefficients. sps_scaling_list_enabled_flag equal to zero specifies that no non-default scaling matrix is used for the scaling process for transform coefficients.

In the case of GDR, a syntax element called gdr_enabled_flag is signaled at the SPS level and allows deactivating GDR when equal to zero.

When no syntax element indicates that a coding tool using at least one coding parameter provided by an APS is activated, step 503 is followed by step 504. Otherwise, if at least one syntax element indicates that a coding tool using at least one parameter provided by an APS is activated, the processing module 40 adapts the decoding of the current block in a step 505. In the first embodiment of step 503, step 505 is executed when at least one of the flags sps_alf_enabled_flag, sps_lmcs_enabled_flag and sps_scaling_list_enabled_flag is equal to one.

In a first embodiment of step 505, the processing module 40 considers that the flags sps_alf_enabled_flag, sps_lmcs_enabled_flag and sps_scaling_list_enabled_flag are equal to zero even when equal to one. In that case, the adaptation of the decoding process consists in ignoring the values of each syntax element indicating that a coding tool using at least one parameter provided by an APS is activated.

In a second embodiment of step 505, when no APS is available and a coding tool using at least one parameter provided by an APS is activated, the processing module 40 outputs a non-conformance information. The non-conformance information is for example, an information indicating that the encoded video stream 211 is not decodable. The non-conformance information is for example outputted to the display 46, in order to display it to a user.

In a third embodiment of step 505, when no APS is available and a coding tool using at least one parameter provided by an APS is activated, instead of searching said parameter in the APS, the processing module 40 obtains each parameter normally provided by an APS from at least one container of at least one second type. In that case, the processing module 40 decodes the current block applying the coding tool (ALF, LMCS, use of a non-default matrix) with the obtained parameter(s).

For example, in a first variant of the third embodiment of step 505, the ALF, LMCS and scaling matrices parameters are signaled at the SPS level.

In that first variant of the third embodiment of step 505, a syntax at the SPS level is described in table TAB1:

TABLE TAB1

| | Descriptor |
|---|---|
| seq_parameter_set_rbsp( ) { | |
| ... | |
|   sps_alf_enabled_flag | u(1) |
|   if( sps_alf_enabled_flag && ChromaArrayType != 0 ) | |
|     sps_ccalf_enabled_flag | u(1) |
|   if( sps_alf_enabled_flag ) | |
|     sps_alf_parameters_in_sps_flag | u(1) |
|   if(sps_alf_parameters_in_sps_flag ) | |
|     alf_data( ) | |
| ... | |
|   sps_lmcs_enabled_flag | u(1) |
|   if( sps_lmcs_enabled_flag ) | |
|     sps_lmcs_parameters_in_sps_flag | u(1) |
|   if(sps_lmcs_parameters_in_sps_flag ) | |
|     lmcs_data( ) | |
| ... | |
|   sps_scaling_enabled_flag | u(1) |
|   if( sps_scaling_list_enabled_flag ) | |
|     sps_scaling_list_parameters_in_sps_flag | u(1) |
|   if(sps_scaling_list_parameters_in_sps_flag ) | |
|     scaling_list_data( ) | |
| ... | |

The parts in bold in table TAB1 corresponds to the syntax elements defined for the first variant of the third embodiment of step 505.

An example of semantic of the flags sps_alf_parameters_in_sps_flag, sps_lmcs_parameters_in_sps_flag, sps_scaling_list_parameters_in_sps_flag is as follows:

sps_alf_parameters_in_sps_flag equal to zero specifies that the ALF parameters are not signaled at the SPS level. sps_alf_parameters_in_sps_flag equal to one specifies that the ALF parameters are signaled at the SPS level. When not present the value of sps_alf_parameters_in_sps_flag is inferred to be zero.

sps_lmcs_parameters_in_sps_flag equal to zero specifies that the LMCS parameters are not signaled at the SPS level. sps_lmcs_parameters_in_sps_flag equal to one specifies that the LMCS parameters are signaled at the SPS level. When not present the value of sps_lmcs_parameters_in_sps_flag is inferred to be zero.

sps_scaling_list_parameters_in_sps_flag equal to zero specifies that the scaling matrix parameters are not signaled at the SPS level. sps_scaling_list_parameters_in_sps_flag equal to one specifies that the scaling matrix are signaled at the SPS level. When not present the value of sps_scaling_list_parameters_in_sps_flag is inferred to be zero.

In tables TAB2 and TAB3, examples of syntax at picture header and slice header level adapted to the first variant of the third embodiment of step 505 are described.

TABLE TAB2

| | Descriptor |
|---|---|
| picture_header_structure( ) { | |
| ... | |
|   if( sps_alf_enabled_flag && alf_info_in_ph_flag) { | |
|     ph_alf_enabled_flag | u(1) |
|     if( ph_alf_enabled_flag ) { | |
|       If (! sps_alf_parameters_in_sps_flag){ | |
|         ph_num_alf_aps_ids_luma | u(3) |
|         for( i = 0; i < ph_num_alf_aps_ids_luma; i++ ) | |
|           ph_alf_aps_id_luma[ i ] | u(3) |
|       } | |
|       if( ChromaArrayType != 0 ) | |
|         ph_alf_chroma_idc | u(2) |
|       if( ph_alf_chroma_idc > 0 && ! sps_alf_parameters_in_sps_flag) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag && ! sps_alf_parameters_in_sps_flag) | |
|           ph_cc_alf_cb_aps_id | u(3) |
|         ph_cc_alf_cr_enabled_flag | u(1) |
|         if( ph_cc_alf_cr_enabled_flag && ! sps_alf_parameters_in_sps_flag) | |
|           ph_cc_alf_cr_aps_id | u(3) |
|       } | |
|     } | |
|   } | |
| ... | |
|   if( sps_lmcs_enabled_flag) { | |
|     ph_lmcs_enabled_flag | u(1) |
|     if( ph_lmcs_enabled_flag) { | |
|       if (!sps_lmcs_parameters_in_sps_flag) | |
|         ph_lmcs_aps_id | u(2) |
|       if( ChromaArrayType != 0 ) | |
|         ph_chroma_residual_scale_flag | u(1) |
|     } | |
|   } | |
|   if( sps_scaling_list_enabled_flag) { | |
|     ph_scaling_list_present_flag | u(1) |
|     if( ph_scaling_list_present_flag && | |
|   !sps_scaling_list_parameters_in_sps_flag) | |
|       ph_scaling_list_aps_id | u(3) |

TABLE TAB2-continued

| | Descriptor |
|---|---|
| } | |
| ... | |
| } | |

TABLE TAB3

| | Descriptor |
|---|---|
| slice_header( ) { | |
| ... | |
|   if( sps_alf_enabled_flag && !alf_info_in_ph_flag ) { | |
|     slice_alf_enabled_flag | u(1) |
|     if( slice_alf_enabled_flag ) { | |
|       If ( !sps_alf_parameters_in_sps_flag){ | |
|         slice_num_alf_aps_ids_luma | u(3) |
|         for( i = 0; i < slice_num_alf_aps_ids_luma; i++ ) | |
|           slice_alf_aps_id_luma[ i ] | u(3) |
|       } | |
|       if( ChromaArrayType != 0 ) | |
|         slice_alf_chroma_idc | u(2) |
|       if( slice_alf_chroma_idc && !sps_alf_parameters_in_sps_flag) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag && !sps_alf_parameters_in_sps_flag) | |
|           slice_cc_alf_cb_aps_id | u(3) |
|         slice_cc_alf_cr_enabled_flag | u(1) |
|         if( slice_cc_alf_cr_enabled_flag && !sps_alf_parameters_in_sps_flag) | |
|           slice_cc_alf_cr_aps_id | u(3) |
|       } | |
|     } | |
|   } | |
| ... | |
| } | |

The parts in bold represent a modification in an existing syntax induced by the proposed syntax at the SPS level represented in table TAB1.

In the first variant of the third embodiment of step 505, if ALF is used when the flag no_aps_constraint_flag is equal to one, the flag sps_alf_parameters_in_sps_flag is equal to one. In addition, in that case, the flag alf_info_in_ph_flag is equal to zero. alf_info_in_ph_flag equal to one specifies that ALF information is present in the picture header syntax structure and not present in slice headers referring to the PPS that do not contain a picture header syntax structure. alf_info_in_ph_flag equal to zero specifies that ALF information is not present in the picture header syntax structure and may be present in slice headers referring to the PPS that do not contain a picture header syntax structure.

In the first variant of the third embodiment of step 505, if LMCS is used when the flag no_aps_constraint_flag is equal to one, the flag sps_lmcs_parameters_in_sps_flag is equal to one.

In the first variant of the third embodiment of step 505, if a non-default scaling matrix is used when the flag no_aps_constraint_flag is equal to one, the flag sps_scaling_list_parameters_in_sps_flag is equal to one.

In an alternative to the first variant of the third embodiment of step 505, instead of adding three SPS level flags (i.e. sps_alf_parameters_in_sps_flag, sps_lmcs_parameters_in_sps_flag and sps_scaling_list_parameters_in_sps_flag), a single SPS level flag sps_aps_parameters_signaling is used to signal ALF, LMCS and scaling lists parameters at SPS level. The flag sps_aps_parameters_signaling is coded if ALF, LMCS or scaling list are activated by their SPS flags. In that alternative to the first variant of the third embodiment of step 505, a syntax at the SPS level is described in table TAB1_Bis:

TABLE TAB1_Bis

| | Descriptor |
|---|---|
| seq_parameter_set_rbsp( ) { | |
|   ... | |
|   sps_alf_enabled_flag | u(1) |
|   ... | |
|   sps_lmcs_enabled_flag | u(1) |
|   ... | |
|   sps_scaling_enabled_flag | u(1) |
|   if (sps_alf_enabled_flag || sps_lmcs_enabled_flag || sps_scaling_list_parameters_in_sps_flag) | |
|     sps_aps_parameters_signaling | u(1) |
|   If(sps_aps_parameters_signaling){ | |
|     alf_data( ) | |

TABLE TAB1_Bis-continued

| | Descriptor |
|---|---|
|     lmcs_data( )<br>    scaling_list_data( )<br>  }<br>... | |

The parts in bold in table TAB1_Bis corresponds to the syntax elements defined for the alternative to the first variant of the third embodiment of step 505.

In tables TAB2_Bis and TAB3_Bis, examples of syntax at picture header and slice header level adapted to the first variant of the third embodiment of step 505 are described.

TABLE TAB2_Bis

| | Descriptor |
|---|---|
| picture_header_structure( ) {<br>...<br>  if( sps_alf_enabled_flag && alf_info_in_ph_flag) {<br>    ph_alf_enabled_flag | u(1) |
|     if( ph_alf_enabled_flag ) {<br>      If (!sps_aps_parameters_signaling){<br>        ph_num_alf_aps_ids_luma | u(3) |
|         for( i = 0; i < ph_num_alf_aps_ids_luma; i++ )<br>          ph_alf_aps_id_luma[ i ] | u(3) |
|       }<br>      if( ChromaArrayType != 0 )<br>        ph_alf_chroma_idc | u(2) |
|       if( ph_alf_chroma_idc > 0 && ! sps_aps_parameters_signaling)<br>        ph_alf_aps_id_chroma | u(3) |
|       if( sps_ccalf_enabled_flag ) {<br>        ph_cc_alf_cb_enabled_flag | u(1) |
|         if( ph_cc_alf_cb_enabled_flag && ! sps_aps_parameters_signaling)<br>          ph_cc_alf_cb_aps_id | u(3) |
|         ph_cc_alf_cr_enabled_flag | u(1) |
|         if( ph_cc_alf_cr_enabled_flag && ! sps_aps_parameters_signaling)<br>          ph_cc_alf_cr_aps_id | u(3) |
|       }<br>    }<br>  }<br>...<br>  if( sps_lmcs_enabled_flag) {<br>    ph_lmcs_enabled_flag | u(1) |
|     if( ph_lmcs_enabled_flag) {<br>      if (!sps_aps_parameters_signaling)<br>        ph_lmcs_aps_id | u(2) |
|       if( ChromaArrayType != 0 )<br>        ph_chroma_residual_scale_flag | u(1) |
|     }<br>  }<br>  if( sps_scaling_list_enabled_flag) {<br>    ph_scaling_list_present_flag | u(1) |
|     if( ph_scaling_list_present_flag && ! sps_aps_parameters_signaling)<br>      ph_scaling_list_aps_id | u(3) |
|   }<br>...<br>} | |

TABLE TAB3_Bis

| | Descriptor |
|---|---|
| slice_header( ) {<br>...<br>  if( sps_alf_enabled_flag && !alf_info_in_ph_flag ) {<br>    slice_alf_enabled_flag | u(1) |
|     if( slice_alf_enabled_flag ) {<br>      If ( ! sps_aps_parameters_signaling){<br>        slice_num_alf_aps_ids_luma | u(3) |
|         for( i = 0; i < slice_num_alf_aps_ids_luma; i++ )<br>          slice_alf_aps_id_luma[ i ] | u(3) |
|       }<br>      if( ChromaArrayType != 0 )<br>        slice_alf_chroma_idc | u(2) |
|       if( slice_alf_chroma_idc && ! sps aps_parameters_signaling)<br>        slice_alf_aps_id_chroma | u(3) |

TABLE TAB3_Bis-continued

| | Descriptor |
|---|---|
| if( sps_ccalf_enabled_flag ) { | |
| slice_cc_alf_cb_enabled_flag | u(1) |
| if( slice_cc_alf_cb_enabled_flag && ! sps_aps_parameters_signaling) | |
| slice_cc_alf_cb_aps_id | u(3) |
| slice_cc_alf_cr_enabled_flag | u(1) |
| if( slice_cc_alf_cr_enabled_flag && ! sps_aps_parameters_signaling) | |
| slice_cc_alf_cr_aps_id | u(3) |
| } | |
| } | |
| } | |
| ... | |
| } | |

The parts in bold represent a modification in an existing syntax induced by the proposed syntax at the SPS level represented in table TAB1_Bis.

In a second variant of the third embodiment of step 505, the ALF, LMCS and scaling matrices parameters are signaled at the PPS level. One advantage is that PPS can be signaled more frequently than SPS. That is, for a single sequence, one or multiple PPS can be signaled.

In that second variant of the third embodiment of step 505, a syntax at the PPS level is described in table TAB4:

TABLE TAB4

| | Descriptor |
|---|---|
| pic_parameter_set_rbsp( ) { | |
| ... | |
| pps_alf_parameters_in_pps_flag | u(1) |
| if (pps_alf_parameters_in_pps_flag) | |
| alf_data( ) | |
| alf_info_in_ph_flag | u(1) |
| pps_lmcs_parameters_in_pps_flag | u(1) |
| if (pps_lmcs_parameters_in_pps_flag) | |
| lmcs_data( ) | |
| pps_scaling_list_parameters_in_pps_flag | u(1) |
| if (pps_scaling_list_parameters_in_pps_flag) | |
| scaling_list_data( ) | |
| ... | |
| } | |

The new syntax adapted to the second variant of the third embodiment of step 505 is represented in bold in table TAB4.

An example of semantic of the flags pps_alf_parameters_in_ps_flag, pps_lmcs_parameters_in_pps_flag, pps_scaling_list_parameters_in_pps_flag is as follows:

pps_alf_parameters_in_pps_flag equal to zero specifies that the ALF parameters are not signaled at the PPS level. pps_alf_parameters_in_pps_flag equal to one specifies that the ALF parameters are signaled at the PPS level.

pps_lmcs_parameters_in_pps_flag equal to zero specifies that the LMCS parameters are not signaled at the PPS level. pps_lmcs_parameters_in_pps_flag equal to one specifies that the LMCS parameters are signaled at the PPS level.

pps_scaling_list_parameters_in_pps_flag equal to zero specifies that the scaling matrix parameters are not signaled at the PPS level. pps_scaling_list_parameters_in_pps_flag equal to one specifies that the scaling matrix are signaled at the PPS level.

In tables TAB5 and TAB6, examples of syntax at picture header and slice header level adapted to the second variant of the third embodiment of step 505 are described.

TABLE TAB5

| | Descriptor |
|---|---|
| picture_header_structure( ) { | |
| ... | |
| if( sps_alf_enabled_flag && alf_info_in_ph_flag) { | |
| ph_alf_enabled_flag | u(1) |
| if( ph_alf_enabled_flag ) { | |
| If (! pps_alf_parameters_in_pps_flag){ | |
| ph_num_alf_aps_ids_luma | u(3) |
| for( i = 0; i < ph_num_alf_aps_ids_luma; i++ ) | |
| ph_alf_aps_id_luma[ i ] | u(3) |
| } | |
| if( ChromaArrayType != 0 ) | |
| ph_alf_chroma_idc | u(2) |
| if( ph_alf_chroma_idc > 0 && ! pps_alf_parameters_in_pps_flag) | |
| ph_alf_aps_id_chroma | u(3) |
| if( sps_ccalf_enabled_flag ) { | |
| ph_cc_alf_cb_enabled_flag | u(1) |
| if( ph_cc_alf_cb_enabled_flag && ! pps_alf_parameters_in_pps_flag) | |
| ph_cc_alf_cb_aps_id | u(3) |
| ph_cc_alf_cr_enabled_flag | u(1) |
| if( ph_cc_alf_cr_enabled_flag && ! pps_alf_parameters_in_pps_flag) | |
| ph_cc_alf_cr_aps_id | u(3) |
| } | |
| } | |
| } | |

TABLE TAB5-continued

|  | Descriptor |
|---|---|
| ... | |
| if( sps_lmcs_enabled_flag) { | |
|   ph_lmcs_enabled_flag | u(1) |
|   if( ph_lmcs_enabled_flag) { | |
|     If (pps_lmcs_parameters_in_pps_flag) | |
|       ph_lmcs_aps_id | u(2) |
|     if( ChromaArrayType != 0 ) | |
|       ph_chroma_residual_scale_flag | u(1) |
|     } | |
|   } | |
| } | |
| if( sps_scaling_list_enabled_flag) { | |
|   ph_scaling_list_present_flag | u(1) |
|   if( ph_scaling_list_present_flag && | |
| !pps_scaling_list_parameters_in_pps_flag ) | |
|     ph_scaling_list_aps_id | u(3) |
| } | |
| ... | |
| } | |

TABLE TAB6

|  | Descriptor |
|---|---|
| slice_header( ) { | |
| ... | |
|   if( sps_alf_enabled_flag && !alf_info_in_ph_flag ) { | |
|     slice_alf_enabled_flag | u(1) |
|     if( slice_alf_enabled_flag ) { | |
|       If (!pps_alf_parameters_in_pps_flag){ | |
|         slice_num_alf_aps_ids_luma | u(3) |
|         for( i = 0; i < slice_num_alf_aps_ids_luma; i++ ) | |
|           slice_alf_aps_id_luma[ i ] | u(3) |
|       } | |
|       if( ChromaArrayType != 0 ) | |
|         slice_alf_chroma_idc | u(2) |
|       if( slice_alf_chroma_idc && !pps_alf_parameters_in_pps_flag ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag && !pps_alf_parameters_in_pps_flag ) | |
| ) | |
|           slice_cc_alf_cb_aps_id | u(3) |
|         slice_cc_alf_cr_enabled_flag | u(1) |
|         if( slice_cc_alf_cr_enabled_flag && !pps_alf_parameters_in_pps_flag ) | |
|           slice_cc_alf_cr_aps_id | u(3) |
|         } | |
|       } | |
|     } | |
| ... | |
| } | |

The parts in bold represent a modification in an existing syntax induced by the proposed syntax at the PPS level represented in table TAB4.

In the second variant of the third embodiment of step 505, if ALF is used when the flag no_aps_constraint_flag is equal to one, the flag pps_alf_parameters_in_pps_flag is equal to one.

In the second variant of the third embodiment of step 505, if LMCS is used when the flag no_aps_constraint_flag is equal to one, the flag pps_lmcs_parameters_in_pps_flag is equal to one.

In the second variant of the third embodiment of step 505, if a non-default scaling matrix is used when the flag no_aps_constraint_flag is equal to one, the flag pps_scaling_list_parameters_in_pps_flag is equal to one.

In an alternative to the second variant of the third embodiment of step 505, instead of defining three PPS level flags (pps_alf_parameters_in_pps_flag, pps_lmcs_parameters_in_pps_flag and pps_scaling_list_parameters_in_pps_flag), a single flag pps_aps_parameters_signaling is used. In that alternative to the second variant of the third embodiment of step 505, a syntax at the PPS level is described in table TAB4_Bis:

TABLE TAB4_Bis

|  | Descriptor |
|---|---|
| pic_parameter_set_rbsp( ) { | |
| ... | |
|   pps_aps_parameters_signaling | u(1) |
|   if (pps_aps_parameters_signaling){ | |
|     alf_data( ) | |
|     lmcs_data( ) | |
|     scaling_list_data( ) | |
|   } | |
| ... | |
| } | |

In tables TAB5 Bis and TAB6_Bis, examples of syntax at picture header and slice header levels adapted to the alternative to the second variant of the third embodiment of step 505 are described.

TABLE TAB5_Bis

|  | Descriptor |
|---|---|
| picture_header_structure( ) { | |
| ... | |
|   if( sps_alf_enabled_flag && alf_info_in_ph_flag) { | |
|     ph_alf_enabled_flag | u(1) |
|     if( ph_alf_enabled_flag ) { | |
|       If (!pps_aps_parameters_signaling){ | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       } | |
|       if( ChromaArrayType != 0 ) | |
|         ph_alf_chroma_idc | u(2) |
|       if( ph_alf_chroma_idc > 0 && ! pps_aps_parameters_signaling) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag && ! pps_aps_parameters_signaling) | |
|           ph_cc_alf_cb_aps_id | u(3) |
|         ph_cc_alf_cr_enabled_flag | u(1) |
|         if( ph_cc_alf_cr_enabled_flag && ! pps_aps_parameters_signaling) | |
|           ph_cc_alf_cr_aps_id | u(3) |
|       } | |
|     } | |
|   } | |
| ... | |
|   if( sps_lmcs_enabled_flag) { | |
|     ph_lmcs_enabled_flag | u(1) |
|     if( ph_lmcs_enabled_flag) { | |
|       If (pps_aps_parameters_signaling) | |
|       ph_lmcs_aps_id | u(2) |
|       if( ChromaArrayType != 0 ) | |
|         ph_chroma_residual_scale_flag | u(1) |
|     } | |
|   } | |
|   if( sps_scaling_list_enabled_flag) { | |
|     ph_scaling_list_present_flag | u(1) |
|     if( ph_scaling_list_present_flag && ! pps_aps_parameters_signaling ) | |
|       ph_scaling_list_aps_id | u(3) |
|   } | |
| ... | |
| } | |

TABLE TAB6_Bis

|  | Descriptor |
|---|---|
| slice_header( ) { | |
| ... | |
|   if( sps_alf_enabled_flag && !alf_info_in_ph_flag ) { | |
|     slice_alf_enabled_flag | u(1) |
|     if( slice_alf_enabled_flag ) { | |
|       If (!pps_aps_parameters_signaling){ | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       } | |
|       if( ChromaArrayType != 0 ) | |
|         slice_alf_chroma_idc | u(2) |
|       if( slice_alf_chroma_idc && ! pps_aps_parameters_signaling ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag && ! pps_aps_parameters_signaling ) ) | |
|           slice_cc_alf_cb_aps_id | u(3) |
|         slice_cc_alf_cr_enabled_flag | u(1) |
|         if( slice_cc_alf_cr_enabled_flag && ! pps_aps_parameters_signaling ) | |

TABLE TAB6_Bis-continued

| | Descriptor |
|---|---|
| slice_cc_alf_cr_aps_id<br>    }<br>   }<br>  }<br> ...<br>} | u(3) |

In a third variant of the third embodiment of step 505, the ALF, LMCS and scaling matrices parameters are signaled at the picture header level. One advantage is that pictures headers are signaled more frequently than SPS and PPS.

In that third variant of the third embodiment of step 505, a syntax at the picture header (PH) level and at the slice level is described in table TAB7 and TAB_7_Bis:

TABLE TAB7

| | Descriptor |
|---|---|
| picture_header_structure( ) {<br> ...<br> if( sps_alf_enabled_flag && alf_info_in_ph_flag) { | |
|   ph_alf_enabled_flag | u(1) |
|   if( ph_alf_enabled_flag ) { | |
|    ph_alf_parameters_in_ph_flag | u(1) |
|    if(ph_alf_parameters_in_ph_flag) | |
|     alf_data( ) | |
|    If (! ph_alf_parameters_in_ph flag){ | |
|     ph_num_alf_aps_ids_luma | u(3) |
|     for( i = 0; i < ph_num_alf_aps_ids_luma; i++ ) | |
|      ph_alf_aps_id_luma[ i ] | u(3) |
|     } | |
|     if( ChromaArrayType != 0 ) | |
|      ph_alf_chroma_idc | u(2) |
|     if( ph_alf_chroma_idc > 0 && ! ph_alf_parameters_in_ph_flag ) | |
|      ph_alf_aps_id_chroma | u(3) |
|     if( sps_ccalf_enabled_flag ) { | |
|      ph_cc_alf_cb_enabled_flag | u(1) |
|      if( ph_cc_alf_cb_enabled_flag && ! ph_alf_parameters_in_ph_flag) | |
|       ph_cc_alf_cb_aps_id | u(3) |
|      ph_cc_alf_cr_enabled_flag | u(1) |
|      if( ph_cc_alf_cr_enabled_flag && ! ph_alf_parameters_in_ph_flag) | |
|       ph_cc_alf_cr_aps_id | u(3) |
|     }<br>   }<br>  }<br> } | |
|  if( sps_lmcs_enabled_flag) { | |
|   ph_lmcs_enabled_flag | u(1) |
|   ph_lmcs_parameters_in_ph_flag | u(1) |
|   if(ph_lmcs_parameters_in_ph_flag) | |
|    lmcs_data( ) | |
|   if( ph_lmcs_enabled_flag && !ph_lmcs_parameters_in_ph_flag) { | |
|    ph_lmcs_aps_id | u(2) |
|    if( ChromaArrayType != 0 ) | |
|     ph_chroma_residual_scale_flag | u(1) |
|   }<br> } | |
|  if( sps_scaling_list_enabled_flag) { | |
|   ph_scaling_list_present_flag | u(1) |
|   ph_scaling_list_parameters_in_ph_flag | u(1) |
|   if(ph_scaling_list_parameters_in_ph_flag) | |
|    scaling_list_data( ) | |
|   if( ph_scaling_list_present_flag && ! ph_scaling_list_parameters_in_ph_flag) | |
|    ph_scaling_list_aps_id | u(3) |
|  }<br>...  | |

TABLE TAB7_Bis

| | Descriptor |
|---|---|
| slice_header( ) { | |
| ... | |
|   if( sps_alf_enabled_flag && !alf_info_in_ph_flag ) { | |
|     slice_alf_enabled_flag | u(1) |
|     if( slice_alf_enabled_flag ) { | |
|       If (!ph_alf_parameters_in_ph_flag){ | |
|         slice_num_alf_aps_ids_luma | u(3) |
|         for( i = 0; i < slice_num_alf_aps_ids_luma; i++ ) | |
|           slice_alf_aps_id_luma[ i ] | u(3) |
|       } | |
|       if( ChromaArrayType != 0 ) | |
|         slice_alf_chroma_idc | u(2) |
|       if( slice_alf_chroma_idc && !ph_alf_parameters_in_ph flag ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag && !ph_alf_parameters_in_ph_flag ) ) | |
|           slice_cc_alf_cb_aps_id | u(3) |
|         slice_cc_alf_cr_enabled_flag | u(1) |
|         if( slice_cc_alf_cr_enabled_flag && !ph_alf_parameters_in_ph_flag ) | |
|           slice_cc_alf_cr_aps_id | u(3) |
|       } | |
|     } | |
|   } | |
| } | |

The new syntax adapted the third variant of the third embodiment of step 505 is represented in bold in table TAB7.

An example of semantic of the flags ph_alf_parameters_in_ph_flag, ph_lmcs_parameters_in_ph_flag, ph_scaling_list_parameters_in_ph_flag is as follows:

ph_alf_parameters_in_ph_flag equal to zero specifies that the ALF parameters are not signaled at the PH level. ph_alf_parameters_in_ph_flag equal to one specifies that the ALF parameters are signaled at the PH level. When not present the value of ph_alf_parameters_in_ph_flag is inferred to be zero.

ph_lmcs_parameters_in_ph_flag equal to zero specifies that the LMCS parameters are not signaled at the PH level. ph_lmcs_parameters_in_ph_flag equal to 1 specifies that the LMCS parameters are signaled at the PH level. When not present the value of ph_lmcs_parameters_in_ph_flag is inferred to be zero.

ph_scaling_list_parameters_in_ph_flag equal to zero specifies that the scaling matrix parameters are not signaled at the PH level. ph_scaling_list_parameters_in_ph_flag equal to one specifies that the scaling list are signaled at the PH level. When not present the value of ph_scaling_list_parameters_in_ph_flag is inferred to be zero.

In the third variant of the third embodiment of step 505, if ALF is used when the flag no_aps_constraint_flag is equal to one, the flag ph_alf_parameters_in_ph_flag is equal to one.

In the third variant of the third embodiment of step 505, if LMCS is used when the flag no_aps_constraint_flag is equal to one, the flag ph_lmcs_parameters_in_ph_flag is equal to one.

In the third variant of the third embodiment of step 505, if a non-default scaling matrix is used when the flag no_aps_constraint_flag is equal to one, the flag ph_scaling_list_parameters_in_ph_flag is equal to one.

In a fourth variant of the third embodiment of step 505, the ALF, LMCS and scaling matrices parameters are signaled at the slice header level.

In that fourth variant of the third embodiment of step 505, a syntax at the slice header (SH) level is described in table TAB8:

TABLE TAB8

| | Descriptor |
|---|---|
| slice_header( ) { | |
| ... | |
|   if( sps_alf_enabled_flag && !alf_info_in_ph_flag) { | |
|     slice_alf_enabled_flag | u(1) |
|     sh_alf_parameters_in_sh_flag | u(1) |
|     if(sh_alf_parameters_in_sh_flag) | |
|       alf_data( ) | |
|     if( slice_alf_enabled_flag ) { | |
|       If (! sh_alf_parameters_in_sh_flag){ | |
|         slice_num_alf_aps_ids_luma | u(3) |
|         for( i = 0; i < slice_num_alf_aps_ids_luma; i++ ) | |
|           slice_alf_aps_id_luma[ i ] | u(3) |
|       } | |
|       if( ChromaArrayType != 0 ) | |
|         slice_alf_chroma_idc | u(2) |
|       if( slice_alf_chroma_idc && ! sh_alf_parameters_in_sh_flag) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag && ! sh_alf_parameters_in_sh_flag) | |

TABLE TAB8-continued

| | Descriptor |
|---|---|
|       slice_cc_alf_cb_aps_id | u(3) |
|      slice_cc_alf_cr_enabled_flag | u(1) |
|      if( slice_cc_alf_cr_enabled_flag && ! sh_alf_parameters_in_sh_flag) | |
|        slice_cc_alf_cr_aps_id | u(3) |
|      } | |
|     } | |
|   } | |
| } | |
| ... | |
| if(slice_lmcs_enabled_flag) | |
|   sh_lmcs_parameters_in_sh_flag | u(1) |
| if(sh_lmcs_parameters_in_sh_flag) | |
|     lmcs_data( ) | |
| if( sps_scaling_list_enabled_flag && slice_scaling_list_used_flag ) | |
|   sh_scaling_list_parameters_in_sh_flag | u(1) |
| if(sh_scaling_list_parameters_in_sh_flag) | |
|     scaling_list_data( ) | |
| } | |

The new syntax adapted the fourth variant of the third embodiment of step 505 is represented in bold in table TAB7.

An example of semantic of the flags sh_alf_parameters_in_sh_flag, sh_lmcs_parameters_in_sh_flag, sh_scaling_list_parameters_in_sh_flag is as follows:

- sh_alf_parameters_in_sh_flag equal to zero specifies that the ALF parameters are not signaled at the SH level. sh_alf_parameters_in_sh_flag equal to one specifies that the ALF parameters are signaled at the SH level. When not present the value of sh_alf_parameters_in_sh_flag is inferred to be zero.
- sh_lmcs_parameters_in_sh_flag equal to zero specifies that the LMCS parameters are not signaled at the SH level. sh_lmcs_parameters_in_sh_flag equal to one specifies that the LMCS parameters are signaled at the SH level. When not present the value of sh_lmcs_parameters_in_sh_flag is inferred to be zero.
- sh_scaling_list_parameters_in_sh_flag equal to zero specifies that the scaling matrix parameters are not signaled at the SH level. sh_scaling_list_parameters_in_sh_flag equal to one specifies that the scaling matrix are signaled at the SH level. When not present the value of sh_scaling_list_parameters_in_sh_flag is inferred to be zero.

In the fourth variant of the third embodiment of step 505, if ALF is used when the flag no_aps_constraint_flag is equal to one, the flag sh_alf_parameters_in_sh_flag is equal to one.

In the fourth variant of the third embodiment of step 505, if LMCS is used when the flag no_aps_constraint_flag is equal to one, the flag sh_lmcs_parameters_in_sh_flag is equal to one.

In the third variant of the third embodiment of step 505, if a non-default scaling matrix is used when the flag no_aps_constraint_flag is equal to one, the flag sh_scaling_list_parameters_in_sh_flag is equal to one.

In a fifth variant of the third embodiment of step 505, the ALF, LMCS and scaling matrices parameters are signaled at any level via a flag indicating their use. In that case for example, there is a flag in SPS indicating the coding in SPS level, another in PPS, another in PH and another in SH. The parameters coded in higher level shall not be coded in lower level. The corresponding syntax is described in tables TAB9, TAB10, TAB11 and TAB12 (the semantics remains the same as in previous variants of the third embodiment of step 505):

TABLE TAB9

| | Descriptor |
|---|---|
| seq_parameter_set_rbsp( ) { | |
| ... | |
|   sps_alf_enabled_flag | u(1) |
|   if( sps_alf_enabled_flag && ChromaArrayType != 0 ) | |
|     sps_ccalf_enabled_flag | u(1) |
|   if( sps_alf_enabled_flag ) | |
|     sps_alf_parameters_in_sps_flag | u(1) |
|   if(sps_alf_parameters_in_sps_flag ) | |
|     alf_data( ) | |
| ... | |
|   sps_lmcs_enabled_flag | u(1) |
|   if( sps_lmcs_enabled_flag ) | |
|     sps_lmcs_parameters_in_sps_flag | u(1) |
|   if(sps_lmcs_parameters_in_sps_flag ) | |
|     lmcs_data( ) | |
| ... | |
|   sps_scaling_enabled_flag | u(1) |
|   if( sps_scaling_list_enabled_flag ) | |
|     sps_scaling_list_parameters_in_sps_flag | u(1) |
|   if(sps_scaling_list_parameters_in_sps_flag ) | |
|     scaling_list_data( ) | |
| ... | |

TABLE TAB10

| | Descriptor |
|---|---|
| pic_parameter_set_rbsp( ) { | |
|   ... | |
|   pps_alf_parameters_in_pps_flag | u(1) |
|   if (pps_alf_parameters_in_pps_flag) | |
|     alf_data( ) | |
|   ... | |
|   alf_info_in_ph_flag | u(1) |
|   pps_lmcs_parameters_in_pps_flag | u(1) |
|   if (pps_lmcs_parameters_in_pps_flag) | |
|     lmcs_data( ) | |
|   pps_scaling_list_parameters_in_pps_flag | u(1) |
|   if (pps_scaling_list_parameters_in_pps_flag) | |
|     scaling_list_data( ) | |
|   ... | |
| } | |

TABLE TAB11

| | Descriptor |
|---|---|
| picture_header_structure( ) { | |
| ... | |
|   if( sps_alf_enabled_flag && alf_info_in_ph_flag) { | |
|     ph_alf_enabled_flag | u(1) |
|     if( ph_alf_enabled_flag ) { | |
|     if(!sps_alf_parameters_in_sps_flag && ! pps_alf_parameters_in_pps_flag ) | |
|       ph_alf_parameters_in_ph_flag | u(1) |
|     if(ph_alf_parameters_in_ph flag) | |
|       alf_data( ) | |
|     If (! ph_alf_parameters_in_ph_flag && !sps_alf_parameters_in_sps_flag && ! pps_alf_parameters_in_pps_flag){ | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|     } | |
|     if( ChromaArrayType != 0 ) | |
|       ph_alf_chroma_idc | u(2) |
|     if( ph_alf_chroma_idc > 0 && ! ph_alf_parameters_in_ph_flag && !sps_alf_parameters_in_sps_flag && ! pps_alf_parameters_in_pps_flag) | |
|       ph_alf_aps_id_chroma | u(3) |
|     if( sps_ccalf_enabled_flag ) { | |
|       ph_cc_alf_cb_enabled_flag | u(1) |
|       if( ph_cc_alf_cb_enabled_flag && ! ph_alf_parameters_in_ph_flag && !sps_alf_parameters_in_sps_flag && ! pps alf parameters_in_pps_flag) | |
|         ph_cc_alf_cb_aps_id | u(3) |
|       ph_cc_alf_cr_enabled_flag | u(1) |
|       if( ph_cc_alf_cr_enabled_flag && ! ph_alf_parameters_in_ph_flag && !sps_alf_parameters_in_sps_flag && ! pps_alf_parameters_in_pps_flag) | |
|         ph_cc_alf_cr_aps_id | u(3) |
|     } | |
|   } | |
| } | |
| if( sps_lmcs_enabled_flag ) { | |
|   ph_lmcs_enabled_flag | u(1) |
|   if(!sps_lmcs_parameters_in_sps_flag && ! pps_lmcs_parameters in pps flag) | |
|     ph_lmcs_parameters_in_ph_flag | u(1) |
|   if(ph_lmcs_parameters_in_ph_flag) | |
|     lmcs_data( ) | |
|   if( ph_lmcs_enabled_flag && ! ph_lmcs_parameters_in_ph_flag && !sps_lmcs_parameters_in_sps_flag && ! pps_lmcs_parameters_in_pps_flag) { | |
|     ph_lmcs_aps_id | u(2) |
|     if( ChromaArrayType != 0 ) | |
|       ph_chroma_residual_scale_flag | u(1) |
|   } | |
| } | |
| if( sps_scaling_list_enabled_flag &&) { | |
|   ph_scaling_list_present_flag | u(1) |
|   If(!sps_scaling_list_parameters_in_sps_flag && ! pps_scaling_list_parameters_in_pps_flag) | |
|     ph_scaling_list_parameters_in_ph_flag | u(1) |
|   if(ph_scaling_list_parameters_in_ph_flag) | |
|     scaling_list_data( ) | |
|   if( ph_scaling_list_present_flag && !sps_scaling_list_parameters_in_sps_flag && ! pps_scaling_list_parameters_in_pps_flag && ! ph_scaling_list_parameters_in_ph_flag) | |
|     ph_scaling_list_aps_id | u(3) |
| } | |
| ... | |

TABLE TAB12

| | Descriptor |
|---|---|
| slice_header( ) { | |
| ... | |
|   if( sps_alf_enabled_flag && !alf_info_in_ph_flag) { | |
|     slice_alf_enabled_flag | u(1) |
|     if( slice_alf_enabled_flag ) { | |
|     if(!sps_alf_parameters_in_sps_flag && ! pps_alf_parameters_in_pps_flag && !ph_alf_parameters_in_pps_flag ) | |
|       sh_alf_parameters_in_sh_flag | u(1) |
|   if(sh_alf_parameters_in_sh_flag) | |
|     alf_data( ) | |

TABLE TAB12-continued

| | Descriptor |
|---|---|
| If (! sh_alf_parameters_in_sh_flag && !sps_alf_parameters_in_sps_flag && ! pps_alf_parameters_in_pps_flag && !ph_alf_parameters_in_pps_flag){ | |
|     slice_num_alf_aps_ids_luma | u(3) |
|     for( i = 0; i < slice_num_alf_aps_ids_luma; i++ ) | |
|         slice_alf_aps_id_luma[ i ] | u(3) |
|     } | |
|     if( ChromaArrayType != 0 ) | |
|         slice_alf_chroma_idc | u(2) |
|         if( slice_alf_chroma_idc && ! sh_alf_parameters_in_sh_flag && !sps_alf_parameters_in_sps_flag && ! pps_alf_parameters_in_pps_flag && !ph_alf_parameters_in_pps_flag) | |
|             slice_alf_aps_id_chroma | u(3) |
|         if( sps_ccalf_enabled_flag ) { | |
|             slice_cc_alf_cb_enabled_flag | u(1) |
|             if( slice_cc_alf_cb_enabled_flag && ! sh_alf_parameters_in_sh_flag && !sps_alf_parameters_in_sps_flag && ! pps_alf_parameters_in_pps_flag && !ph_alf_parameters_in_pps_flag) | |
|                 slice_cc_alf_cb_aps_id | u(3) |
|             slice_cc_alf_cr_enabled_flag | u(1) |
|             if( slice_cc_alf_cr_enabled_flag && ! sh_alf_parameters_in_sh_flag && !sps_alf_parameters_in_sps_flag && ! pps_alf_parameters_in_pps_flag && !ph_alf_parameters_in_pps_flag) | |
|                 slice_cc_alf_cr_aps_id | u(3) |
|         } | |
|     } | |
| } | |
| ... | |
| if( ph_lmcs_enabled_flag ) | |
|     slice_lmcs_enabled_flag | u(1) |
| If (slice_lmcs_enabled_flag) | |
| if(!sps_lmcs_parameters_in_sps_flag && ! pps_lmcs_parameters_in_pps_flag && !ph_lmcs_parameters_in_pps_flag) | |
|     sh_lmcs_parameters_in_sh_flag | u(1) |
| if(sh_lmcs_parameters_in_sh_flag) | |
|     lmcs_data( ) | |
| slice_scaling_list_present_flag | u(1) |
| If (slice_scaling_list_present_flag !sps_scaling_list_parameters_in_sps_flag && ! pps_scaling_list_parameters_in_pps_flag && !ph_scaling_list_parameters_in_pps_flag) | |
|     sh_scaling_list_parameters_in_sh_flag | u(1) |
| if(sh_scaling_list_parameters_in_sh_flag) | |
|     scaling_list_data( ) | |
| ... | |

The new syntax adapted the fifth variant of the third embodiment of step 505 is represented in bold in tables TAB9, TAB10, TAB11 and TAB12.

In the fifth variant of the third embodiment of step 505:
the flag pps_alf_parameters_in_pps_flag is equal to zero if sps_alf_parameters_in_sps_flag is equal to one;
the flag pps_lmcs_parameters_in_pps_flag is equal to zero if sps_lmcs_parameters_in_sps_flag is equal to one;
the flag pps_scaling_list_parameters_in_pps_flag is equal to zero if sps_scaling_list_parameters_in_sps_flag is equal to one;
if no_aps_constraint_flag is equal to one, the ALF, LMCS, and Scaling matrix parameters are coded (if activated) at SPS and/or PPS and/or PH and/or SH level.

In some case, the parameters of the tools (ALF, LMCS and non-default scaling matrix) normally signaled at the APS level can be spread in other containers. For instance, one the parameters of a first coding tool are coded at the SPS level, the parameters of a second coding tool are coded at the PPS level and the parameters of a third coding tool are coded at the PH level.

In a second embodiment of step 502, the information indicating if an APS is absent from the encoded video stream obtained by the processing module 40 is an information indicating if an APS has been lost during a transmission of the encoded video stream 211.

In a third embodiment of step 502, the information indicating if an APS is absent from the encoded video stream obtained by the processing module 40 is an information indicating that the processing module 40 is not designed to consider APS. In that case, APS eventually present in an encoded video stream received by the processing module 40 are ignored by the processing module 40.

In a second embodiment of step 503, the syntax element indicating if a coding tool using at least one coding parameter provided by an APS is activated for the current block checked by the processing module 40 is a syntax element at the slice level, for example, a syntax element slice_alf_enabled_flag. slice_alf_enabled_flag equal to one specifies that ALF is enabled and may be applied to Y, Cb, or Cr color components in a slice. slice_alf_enabled_flag equal to zero specifies that ALF is disabled for all color components in a slice. When not present, the value of slice_alf_enabled_flag is inferred to be equal to ph_alf_enabled_flag.

In a third embodiment of step 503, the syntax element indicating if a coding tool using at least one coding parameter provided by an APS is activated for the current block checked by the processing module 40 is a syntax element at the CTU level, for example, a syntax element alf_ctb_flag [cIdx][xCtb][yCtb]. alf_ctb_flag[cIdx][xCtb][yCtb] equal to one specifies that ALF is applied to the coding unit of the color component indicated by cIdx of the CTU at luma location (xCtb,yCtb). alf_ctb_flag[cIdx][xCtb][yCtb] equal to zero specifies that ALF is not applied to the CU of the color component indicated by cIdx of the CTU at luma location (xCtb,yCtb). When alf_ctb_flag[cIdx][xCtb][yCtb] is not present, it is inferred to be equal to zero.

In the similar case of GDR, the flag gdr_enabled_flag is equal to zero when no_gdr_constraint_flag equals to one. In a first embodiment related to GDR, the semantics of the constraint flag is as follows:

no_gdr_constraint_flag equal to one specifies that there shall be no NAL unit of type GDR_NUT present in an encoded video stream outputted by an encoder and gdr_enabled_flag shall be zero. no_gdr_constraint_flag equal to zero does not impose such a constraint.

In a second embodiment related to GDR, the constraint flag no_gdr_constraint_flag only constrains the value of the SPS level flag gdr_enabled_flag as follows:

no_gdr_constraint_flag equal to one specifies that gdr_enabled_flag shall be zero. no_gdr_constraint_flag equal to zero does not impose such a constraint.

In a third embodiment related to GDR, a conformance constraint is added to ensure that the SPS level flag gdr_enabled_flag is set to zero when the constraint flag no_gdr_constraint_flag is one:

It is requirement for bitstream conformance that the value of gdr_enabled_flag shall be zero when no_gdr_constraint_flag is equal to one For all embodiments described above, the encoding module and method are compliant with the decoding module and methods. In particular, in the embodiments inducing syntax modifications (in the third embodiment of step 505 for example), the encoding module and method respect said syntax.

Figure 6:
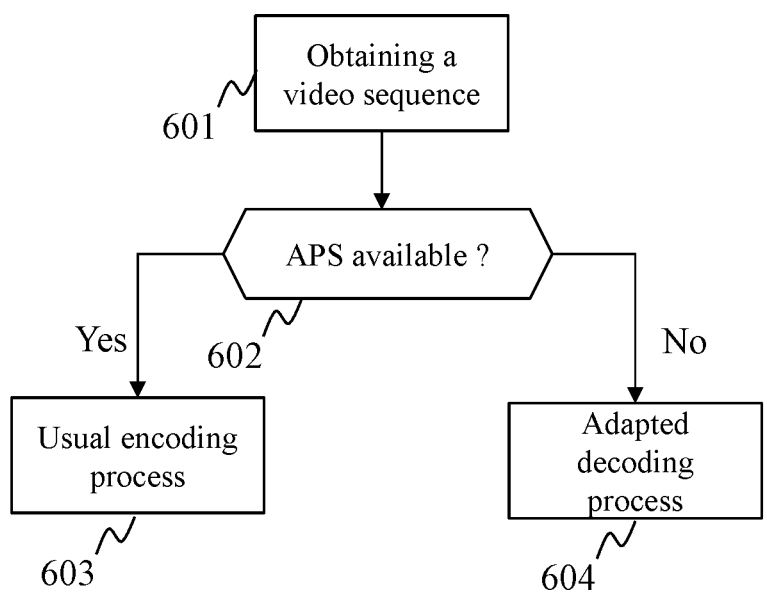

FIG. 6 depicts schematically a solution for adapting an encoding process when no APS can be used.

The process of FIG. 6 is executed by the processing module 40 when the processing module 40 implements an encoding module.

In a step 601, the processing module 40 obtains an original video sequence to encode in the form of an encoded video stream 211.

In a step 602, the processing module 40 obtains an information indicating if the use of APS is authorized to encode the original video sequence. This information is either provided by a user in a form of configuration parameters of the processing module 40.

If the use of APS is authorized, during step 602, this information is signaled in the encoded video stream 211 by the processing module 40 using the flag no_aps_constraint_flag. In that case, the flag no_aps_constraint_flag is set to zero. If the use of APS is not authorized, the flag no_aps_constraint_flag is set to one.

If the use of APS is authorized, a usual encoding process is applied by the processing module 40 in a step 603.

Otherwise, the encoding process of the blocks of the images of the original video sequence is adapted to the impossibility of using APS during step 604.

In a first embodiment of step 604, when APS are not authorized, each coding tool for which at least one parameter is provided by an APS is removed from a list of coding tools considered for encoding the blocks of the video sequence. Consequently, when the flag no_aps_constraint_flag is equal to one, ALF, LMCS and non-default scaling matrix are not considered as a tool that can be used to encode a block of the original video sequence. In this first embodiment of step 604, when no_aps_constraint_flag=1, the SPS level flags sps_alf_enabled_flag, sps_lmcs_enabled_flag and sps_scaling_list_enabled_flag are constrained to be equal to zero. In a variant of the first embodiment of step 604, when no_aps_constrain_flag=1, a flag no_alf_constraint_flag is constrained to one. The flag no_alf_constraint_flag is for example encoded in the syntax element called general_constraint_info( ). When equal to one, the flag no_alf_constraint_flag specifies that sps_alf_enabled_flag shall be equal to zero. no_alf_constraint_flag equal to zero does not impose such a constraint. Similarly, flags no_lmcs_enabled_flag and no_scaling_list_enabled_flag could be used to constraint the values of sps_lmcs_enabled_flag and sps_scaling_list_enabled_flag.

In a second embodiment of step 604, the adapting of the encoding process comprises encoding the parameters normally encoded in the APS in a SPS and/or a PPS and/or a PH and/or a SH if a use of a coding tool using these parameters is authorized for encoding the current block. Consequently, the ALF parameters, the LMCS parameters and/or the non-defaults scaling matrix parameters are encoded in a SPS and/or a PPS and/or a PH and/or a SH is the use of ALF, LMCS and non-default scaling matrix is authorized for blocks of the original video sequence. This embodiment is compliant with the variants of the third embodiment of step 505 of the decoding process. In particular, the second embodiment of step 604 uses the syntax described in relation to the third embodiment of step 505.

In an alternative to the solution of FIG. 6, a single SPS level syntax element sps_no_aps_signaling is used to specify whether the APS, LMCS and scaling list parameters are signaled in other levels than the APS level. When this flag is set to one, signaling these parameters either in slice level or picture level is allowed. This embodiment allows reducing the signaling overhead, where at least three flags are used in previous embodiments. The flag sps_no_aps_signaling is signaled if at least ALF, LMCS or scaling lists are activated by their SPS level flag, otherwise it is inferred to be zero. If sps_no_aps_signaling is equal to one, the alternative coding is allowed. Furthermore, when the constraint flag for APS (i;e. no_aps_constraint_flag) is set to one, this flag must be one as well to allow signaling APS, LMCS and scaling list parameters although no APS is allowed.

The corresponding syntax is described in tables TAB13, TAB14, and TAB15.

TABLE TAB13

| | Descriptor |
|---|---|
| seq_parameter_set_rbsp( ) { | |
| ... | |
| sps_alf_enabled_flag | u(1) |
| ... | |
| sps_lmcs_enabled_flag | u(1) |
| ... | |
| sps_scaling_enabled_flag | u(1) |
| **If (sps_alf_enabled_flag || sps_lmcs_enabled_flag ||** | |
| sps_scaling_enabled_flag) | |
| sps_no_aps_signaling | u(1) |

TABLE TAB14

| | Descriptor |
|---|---|
| picture_header_structure( ) { | |
| ... | |
|   if( sps_alf_enabled_flag && alf_info_in_ph_flag) { | |
|     ph_alf_enabled_flag | u(1) |
|     if( ph_alf_enabled_flag ) { | |
|       If (sps_no_aps_signaling) | |
|         alf_data( ) | |
|       If (!sps_no_aps_signaling){ | |
|         ph_num_alf_aps_ids_luma | u(3) |
|         for( i = 0; i < ph_num_alf_aps_ids_luma; i++ ) | |
|           ph_alf_aps_id_luma[ i ] | u(3) |
|       } | |
|       if( ChromaArrayType != 0 ) | |
|         ph_alf_chroma_idc | u(2) |
|       if( ph_alf_chroma_idc > 0 && ! sps_no_aps_signaling ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag && ! sps_no_aps_signaling) | |
|           ph_cc_alf_cb_aps_id | u(3) |
|         ph_cc_alf_cr_enabled_flag | u(1) |
|         if( ph_cc_alf_cr_enabled_flag && ! sps_no_aps_signaling) | |
|           ph_cc_alf_cr_aps_id | u(3) |
|       } | |
|     } | |
|   } | |
|   if( sps_lmcs_enabled_flag) { | |
|     ph_lmcs_enabled_flag | u(1) |
|     If (sps_no_aps_signaling) | |
|       lmcs_data( ) | |
|     if( ph_lmcs_enabled_flag && ! sps_no_aps_signaling) { | |
|       ph_lmcs_aps_id | u(2) |
|       if( ChromaArrayType != 0 ) | |
|         ph_chroma_residual_scale_flag | u(1) |
|     } | |
|   } | |
|   if( sps_scaling_list_enabled_flag) { | |
|     ph_scaling_list_present_flag | u(1) |
|     If (sps_no_aps_signaling) | |
|       scaling_list_data( ) | |
|     if( ph_scaling_list_present_flag && ! sps_no_aps_signaling) | |
|       ph_scaling_list_aps_id | u(3) |
|   } | |
| ... | |

TABLE TAB15

| | Descriptor |
|---|---|
| slice_header( ) ( | |
| ... | |
|   if( sps_alf_enabled_flag && !alf_info_in_ph_flag) { | |
|     slice_alf_enabled_flag | u(1) |
|     if( slice_alf_enabled_flag ) { | |
|   if(sps_no_aps_signaling) | |
|     alf_data( ) | |
|       If (!sps_no_aps_signaling){ | |
|         slice_num_alf_aps_ids_luma | u(3) |
|         for( i = 0; i < slice_num_alf_aps_ids_luma; i++ ) | |
|           slice_alf_aps_id_luma[ i ] | u(3) |
|       } | |
|       if( ChromaArrayType != 0 ) | |
|         slice_alf_chroma_idc | u(2) |
|       if( slice_alf_chroma_idc && ! sps_no_aps_signaling) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag && ! sps_no_aps_signaling) | |
|           slice_cc_alf_cb_aps_id | u(3) |
|         slice_cc_alf_cr_enabled_flag | u(1) |

TABLE TAB15-continued

| | Descriptor |
|---|---|
|       if( slice_cc_alf_cr_enabled_flag && ! sps_no_aps_signaling) | |
|         slice cc alf cr aps id | u(3) |
|       } | |
|     } | |
|   } | |
| } | |

Further, embodiments can include one or more of the following features, devices, or aspects, alone or in any combination, across various claim categories and types:

- A bitstream or signal that includes syntax conveying information generated according to any of the embodiments described;
- Inserting in the signaling syntax elements that enable the decoder to adapt the decoding process in a manner corresponding to that used by an encoder;
- Creating and/or transmitting and/or receiving and/or decoding a bitstream or signal that includes one or more of the described syntax elements, or variations thereof;
- Creating and/or transmitting and/or receiving and/or decoding according to any of the embodiments described;
- A method, process, apparatus, medium storing instructions, medium storing data, or signal according to any of the embodiments described;
- A TV, set-top box, cell phone, tablet, or other electronic device that performs adaptation of the encoding or decoding process according to any of the embodiments described;
- A TV, set-top box, cell phone, tablet, or other electronic device that performs adaptation of encoding or decoding process according to any of the embodiments described, and that displays (e.g. using a monitor, screen, or other type of display) a resulting image;
- A TV, set-top box, cell phone, tablet, or other electronic device that selects (e.g. using a tuner) a channel to receive a signal including an encoded image, and performs adaptation of the decoding process according to any of the embodiments described;
- A TV, set-top box, cell phone, tablet, or other electronic device that receives (e.g. using an antenna) a signal over the air that includes an encoded image, and performs adaptation of the decoding process according to any of the embodiments described.

The invention claimed is:

1. A method for decoding comprising:
   obtaining video data representative of a video sequence;
   obtaining a first syntax element from the video data indicating with a first value that a presence of a container of type adaptation parameter set is allowed and with a second value that a presence of a container of type adaptation parameter set is not allowed;
   checking a value of a first sequence parameter set level syntax element indicating an activation or a deactivation of a luma mapping and chroma scaling (LMCS) mode, the LMCS mode using at least one coding parameter provided by a container of type adaptation parameter set; and
   outputting an information representative of a nonconformance of the video data responsive to the first syntax element indicating that a presence of a container of type adaptation parameter set is not allowed and the value of the first sequence parameter set level syntax element indicating an activation of the LMCS mode for blocks of the video data.

2. A non-transitory computer readable medium storing program code instructions for causing one or more processors to implement the method according to claim 1.

3. The method of claim 1, further comprising checking a value of a second sequence parameter set level syntax element indicating with a third value that a non-default scaling matrix is used for a scaling process for transform coefficients using at least one scaling parameter provided by a container of type adaptation parameter set and with a fourth value that a default scaling matrix is used for a scaling process for transform coefficients; and
   outputting an information representative of a nonconformance of the video data responsive to the first syntax element indicating that a presence of a container of type adaptation parameter set is not allowed and the value of the second sequence parameter set level syntax element is equal to the third value.

4. The method of claim 1, further comprising checking a value of a sequence level syntax element indicating with a third value that an adaptive loop filter using at least one adaptive loop filter parameter provided by a container of type adaptation parameter set is enabled and with a fourth value that an adaptive loop filter is disabled; and
   outputting an information representative of a nonconformance of the video data responsive to the first syntax element indicating that a presence of a container of type adaptation parameter set is not allowed and the value of the sequence level syntax element is equal to the third value.

5. The method of claim 1, wherein the at least one coding parameter is at least one LMCS parameter.

6. A method for encoding comprising:
   obtaining a video sequence to encode in video data;
   signaling a first syntax element in the video data indicating with a first value that a presence of a container of type adaptation parameter set is allowed and with a second value that a presence of a container of type adaptation parameter set is not allowed; and
   setting a value of a first sequence parameter set level syntax element indicating an activation or a deactivation of a luma mapping and chroma scaling (LMCS) mode, the LMCS mode using at least one coding parameter provided by a container of type adaptation parameter set, based on a value of the first syntax element.

7. A non-transitory computer readable medium storing program code instructions for causing one or more processors to implement the method according to claim 6.

8. The method of claim 6, further comprising:
   setting a value of a second sequence parameter set level syntax element indicating with a third value that a non-default scaling matrix is used for a scaling process for transform coefficients using at least one scaling parameter provided by a container of type adaptation parameter set and with a fourth value that a default scaling matrix is used for a scaling process for transform coefficients based on the value of the first syntax element.

9. The method of claim 6, further comprising:
setting a value of a sequence level syntax element indicating with a third value that an adaptive loop filter using at least one adaptive loop filter parameter provided by a container of type adaptation parameter set is enabled and with a fourth value that an adaptive loop filter is disabled based on the value of the first syntax element.

10. The method of claim 6, wherein the at least one coding parameter is at least one LMCS parameter.

11. A device for decoding comprising electronic circuitry adapted for:
obtaining video data representative of a video sequence;
obtaining a first syntax element from the video data indicating with a first value that a presence of a container of type adaptation parameter set is allowed and with a second value that a presence of a container of type adaptation parameter set is not allowed;
checking a value of a first sequence parameter set level syntax element indicating an activation or a deactivation of a luma mapping and chroma scaling (LMCS) mode, the LMCS mode using at least one coding parameter provided by a container of type adaptation parameter set; and
outputting an information representative of a nonconformance of the video data responsive to the first syntax element indicating that a presence of a container of type adaptation parameter set is not allowed and the value of the first sequence parameter set level syntax element indicating an activation of the LMCS mode for blocks of the video data.

12. The device of claim 11, wherein the electronic circuitry is further configured for checking a value of a second sequence parameter set level syntax element indicating with a third value that a non-default scaling matrix is used for a scaling process for transform coefficients using at least one scaling parameter provided by a container of type adaptation parameter set and with a fourth value that a default scaling matrix is used for a scaling process for transform coefficients; and
outputting an information representative of a nonconformance of the video data responsive to the first syntax element indicating that a presence of a container of type adaptation parameter set is not allowed and the value of the second sequence parameter set level syntax element is equal to the third value.

13. The device of claim 11, wherein the electronic circuitry is further configured for checking a value of a sequence level syntax element indicating with a third value that an adaptive loop filter using at least one adaptive loop filter parameter provided by a container of type adaptation parameter set is enabled and with a fourth value that an adaptive loop filter is disabled; and
outputting an information representative of a nonconformance of the video data responsive to the first syntax element indicating that a presence of a container of type adaptation parameter set is not allowed and the value of the sequence level syntax element is equal to the third value.

14. The device of claim 11, wherein the at least one coding parameter is at least one LMCS parameter.

15. A device for encoding comprising electronic circuitry adapted for:
obtaining a video sequence to encode in video data;
signaling a first syntax element in the video data indicating with a first value that a presence of a container of type adaptation parameter set is allowed and with a second value that a presence of a container of type adaptation parameter set is not allowed; and
setting a value of a first sequence parameter set level syntax element indicating an activation or a deactivation of a luma mapping and chroma scaling (LMCS) mode, the LMCS mode using at least one coding parameter provided by a container of type adaptation parameter set, based on a value of the first syntax element.

16. The device of claim 15, wherein the electronic circuitry is further configured for setting a value of a second sequence parameter set level syntax element indicating with a third value that a non-default scaling matrix is used for a scaling process for transform coefficients using at least one scaling parameter provided by a container of type adaptation parameter set and with a fourth value that a default scaling matrix is used for a scaling process for transform coefficients based on the value of the first syntax element.

17. The device of claim 15, wherein the electronic circuitry is further configured for setting a value of a sequence level syntax element indicating with a third value that an adaptive loop filter using at least one adaptive loop filter parameter provided by a container of type adaptation parameter set is enabled and with a fourth value that an adaptive loop filter is disabled based on the value of the first syntax element.

18. The device of claim 15, wherein the at least one coding parameter is at least one LMCS parameter.

* * * * *